(12) United States Patent
Zonneveld et al.

(10) Patent No.: US 11,333,259 B2
(45) Date of Patent: May 17, 2022

(54) ROTARY PLATE VALVE SYSTEMS

(71) Applicant: HONEYWELL INTERNATIONAL INC., Morris Plains, NJ (US)

(72) Inventors: Paul Zonneveld, Phoenix, AZ (US); David R. Oman, Chandler, AZ (US); Tyler W. Crowe, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/000,926

(22) Filed: Aug. 24, 2020

(65) Prior Publication Data

US 2020/0386332 A1 Dec. 10, 2020

Related U.S. Application Data

(63) Continuation of application No. 15/906,838, filed on Feb. 27, 2018, now Pat. No. 10,865,896.

(51) Int. Cl.
| | |
|---|---|
| *F16K 11/22* | (2006.01) |
| *F01D 17/14* | (2006.01) |
| *F16K 11/074* | (2006.01) |
| *F16K 27/04* | (2006.01) |
| *F16K 3/08* | (2006.01) |

(52) U.S. Cl.
CPC ............ *F16K 11/22* (2013.01); *F01D 17/148* (2013.01); *F16K 3/085* (2013.01); *F16K 11/074* (2013.01); *F16K 27/045* (2013.01)

(58) Field of Classification Search
CPC ... F16K 11/22; F16K 3/10; F16K 3/02; Y10T 137/86533
See application file for complete search history.

(56) References Cited

U.S. PATENT DOCUMENTS

| | | | | | |
|---|---|---|---|---|---|
| 1,738,135 | A | ‡ | 12/1929 | Bannister | ................ F16K 3/085 137/62 |
| 4,440,382 | A | ‡ | 4/1984 | Pruvot | ...................... F16K 3/10 251/16 |
| 4,549,579 | A | ‡ | 10/1985 | Bergmann | .............. F16K 3/085 137/625.21 |

(Continued)

FOREIGN PATENT DOCUMENTS

| | | | | |
|---|---|---|---|---|
| BE | 1008510 A3 | ‡ | 5/1996 | ............. F16K 3/085 |
| BE | 1008510 A3 | | 5/1996 | |

(Continued)

*Primary Examiner* — Kevin R Barss
(74) *Attorney, Agent, or Firm* — Lorenz & Kopf, LLP

(57) ABSTRACT

A rotary valve system includes a first body having a first plurality of fluid channels. The first fluid channels have a common first inlet to receive a fluid and a first outlet. The system includes a second body coupled to the first body. The second body has a second plurality of fluid channels. The second fluid channels have a second inlet and a second outlet. The system includes a plate assembly having a plate coupled between the first body and the second body. The plate is movable between at least a first, open position in which the first outlet of at least one of the first fluid channels is in fluid communication with the second inlet of at least one of the second fluid channels and a second, closed position in which the second inlet of each of the second fluid channels is substantially completely obstructed by the plate.

17 Claims, 20 Drawing Sheets

(56) References Cited

U.S. PATENT DOCUMENTS

| | | | | |
|---|---|---|---|---|
| 4,674,537 | A | ‡ 6/1987 | Bergmann | F16K 3/085 137/62 |
| 6,192,922 | B1 | ‡ 2/2001 | MacGibbon | F16K 3/085 137/486 |
| 8,695,633 | B2 | ‡ 4/2014 | Nowak | F16K 11/074 137/625.15 |
| 8,974,201 | B2 | ‡ 3/2015 | Oulman | F16K 3/085 417/51 |
| 2014/0345717 | A1 | ‡ 11/2014 | Jong | F16K 15/18 137/52 |

FOREIGN PATENT DOCUMENTS

| | | | | |
|---|---|---|---|---|
| DE | 1160290 B | ‡ 12/1963 | | F16K 11/074 |
| DE | 1160290 B | 12/1963 | | |
| DE | 202007013311 U1 | ‡ 2/2009 | | F16K 3/08 |
| DE | 202007013311 U1 | 2/2009 | | |
| DE | 102012106954 A1 | ‡ 1/2014 | | F16K 3/085 |
| DE | 102012106954 A1 | 1/2014 | | |
| DE | 202016106030 U1 | ‡ 1/2018 | | F16K 31/535 |
| DE | 202016106030 U1 | 1/2018 | | |
| FR | 1235296 A | ‡ 7/1960 | | F16K 3/085 |
| FR | 1235296 A | 7/1960 | | |
| GB | 754027 A | ‡ 8/1956 | | F16K 3/085 |
| GB | 754027 A | 8/1956 | | |

‡ imported from a related application

ROTARY PLATE VALVE SYSTEMS

CROSS-REFERENCE TO RELATED APPLICATION

This application is a continuation of U.S. patent application Ser. No. 15/906,838 filed on Feb. 27, 2018. The relevant disclosure of the above application is incorporated herein by reference.

TECHNICAL FIELD

The present disclosure generally relates to gas turbine engines, and more particularly relates to rotary plate valve systems for a gas turbine engine.

BACKGROUND

Gas turbine engines may be employed to power various devices. For example, a gas turbine engine may be employed to power a mobile platform, such as an aircraft. In certain instances, an auxiliary power unit (APU) may be employed prior to start-up of the gas turbine engine to provide power to various consumers, such as a heating and ventilation system onboard the aircraft, for example. As the APU is operating, bleed air may also be extracted from the APU and supplied to an air turbine starter motor to start the gas turbine engine. In order to supply the bleed air to the APU, a butterfly valve may be employed. Often times, the butterfly valve may result in high pressure losses due to the geometry of the butterfly valve. In addition, the geometry of the butterfly valve may require large forces to open and close the valve under load. The large forces require the use of larger actuators, which in turn, increases a weight and a volume associated with the butterfly valve.

Accordingly, it is desirable to provide a rotary plate valve system for a gas turbine engine, which reduces pressure losses through the valve. It is also desirable to provide a rotary plate valve system that provides lower forces for opening and closing the valve under load. By providing lower forces for opening and closing the valve under load, a smaller actuator may be employed, which reduces a weight and a volume associated with the rotary plate valve system. Furthermore, other desirable features and characteristics of the present invention will become apparent from the subsequent detailed description and the appended claims, taken in conjunction with the accompanying drawings and the foregoing technical field and background.

SUMMARY

According to various embodiments, a rotary valve system is provided. The rotary valve system includes a first valve body having a first plurality of fluid channels. Each one of the first plurality of fluid channels has a common first inlet to receive a fluid and a first outlet. The rotary valve system includes a second valve body coupled to the first valve body. The second valve body has a second plurality of fluid channels. Each one of the second plurality of fluid channels has a second inlet and a second outlet. The rotary valve system includes a plate assembly. The plate assembly includes a plate coupled between the first valve body and the second valve body. The plate defines a plurality of openings. The plate is movable between at least a first, open position in which the first outlet of at least one of the first plurality of fluid channels is in fluid communication with the second inlet of at least one of the second plurality of fluid channels and a second, closed position in which the second inlet of each of the second plurality of fluid channels is substantially completely obstructed by the plate.

Further, a rotary valve system is provided according to various embodiments. The rotary valve system includes a first valve body having a first plurality of fluid channels. Each one of the first plurality of fluid channels has a common first inlet to receive a fluid and a first outlet. The first plurality of fluid channels diverges downstream of the common first inlet. The rotary valve system includes a second valve body coupled to the first valve body. The second valve body has a second plurality of fluid channels. Each one of the second plurality of fluid channels has a second inlet and a common second outlet. The rotary valve system includes a plate assembly. The plate assembly has a plate coupled between the first valve body and the second valve body. The plate defines a plurality of openings. The plate is movable between at least a first, open position in which each first outlet of the first plurality of fluid channels is in fluid communication with a respective second inlet of the second plurality of fluid channels and a second, closed position in which the second inlet of each of the second plurality of fluid channels is substantially completely obstructed by the plate.

In addition, in accordance with various embodiments, a rotary valve system is provided. The rotary valve system includes a first valve body having a first plurality of fluid channels. Each one of the first plurality of fluid channels has a common first inlet to receive a fluid and a first outlet. The rotary valve system includes a second valve body coupled to the first valve body. The second valve body has a second plurality of fluid channels. Each one of the second plurality of fluid channels has a second inlet and a second outlet. The second plurality of fluid channels converge within the second valve body downstream from the second inlet. The rotary valve system includes a plate assembly. The plate assembly has a plate coupled between the first valve body and the second valve body. The plate defines a plurality of openings. The plate is movable between at least a first, open surge position in which the first outlet of a first sub-plurality of the first plurality of fluid channels is in fluid communication with the second inlet of a first sub-plurality of the second plurality of fluid channels, a second, closed position in which the second inlet of each of the second plurality of fluid channels is substantially completely obstructed by the plate, and a third, open load position in which the first outlet of a second sub-plurality of the first plurality of fluid channels is in fluid communication with the second inlet of a second sub-plurality of the second plurality of fluid channels.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
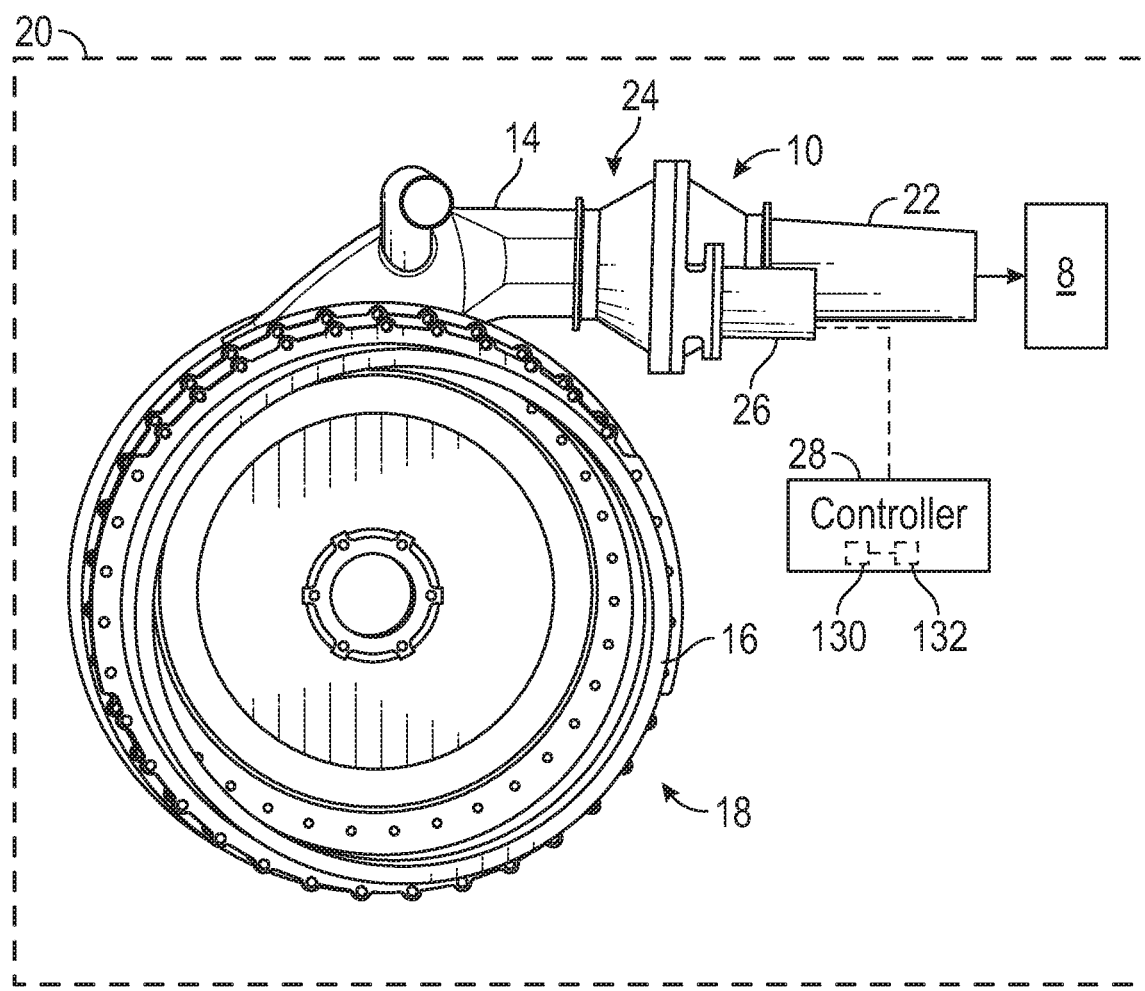
FIG. 1 is a functional block diagram illustrating a mobile platform, such as an aircraft, that includes an exemplary rotary plate valve system having a rotary plate valve and an actuator in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of system that would benefit from controlling fluid flow through a duct, and that the rotating plate valve described herein for use with a gas turbine engine and an auxiliary power unit (APU) is merely one exemplary embodiment according to the present disclosure. Moreover, while the rotating plate valve is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the mobile platform or aircraft systems described herein is merely an exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

With reference to FIG. 1, a rotary plate valve system 10 is shown. In one example, the rotary plate valve system 10 is shown coupled to and in fluid communication with a bleed supply inlet duct 14 to receive bleed fluid, such as bleed air. The bleed supply inlet duct 14 is coupled to and in fluid communication with a base collector 16 of an APU 18 to receive the bleed air. In this example, the APU 18 is onboard an aircraft 20, and the bleed air is selectively provided by the rotary plate valve system 10 to other components or systems associated with the aircraft 20, such as a gas turbine engine 8, via at least one outlet duct 22. The rotary plate valve system 10 includes a rotary plate valve 24 and an actuator 26. As will be discussed, the actuator 26 is responsive to one or more control signals from a controller 28 associated with the APU 18 or the aircraft 20 to move the rotary plate valve 24 to a first, open position (in which bleed air flows through the outlet duct 22), a second, closed position (in which bleed air does not flow through the outlet duct 22) and various positions in between the first, open position and the second closed position to provide modulated flow.

Figure 2:
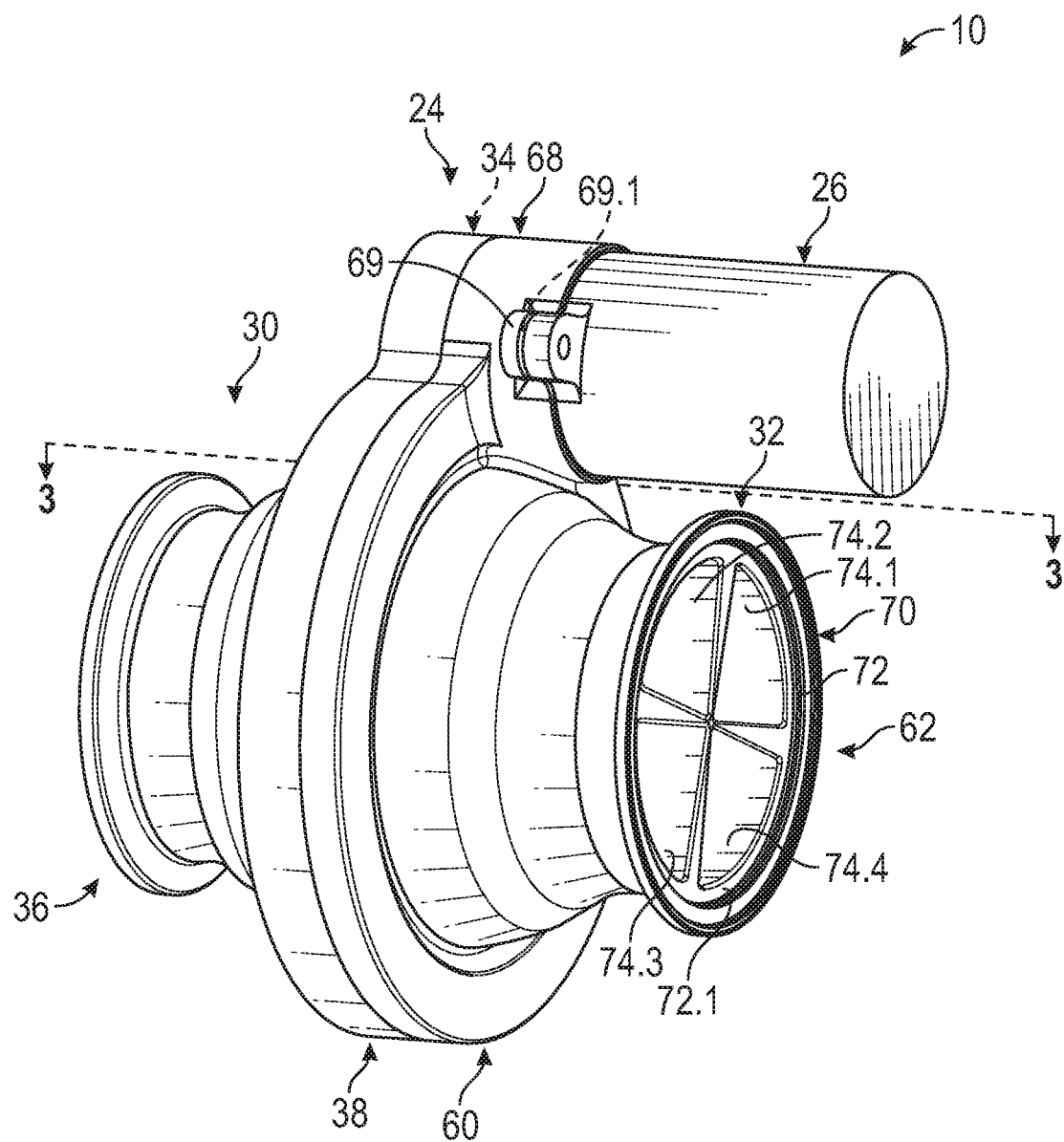
FIG. 2 is a perspective view of the rotary plate valve system of FIG. 1.
Figure 3:
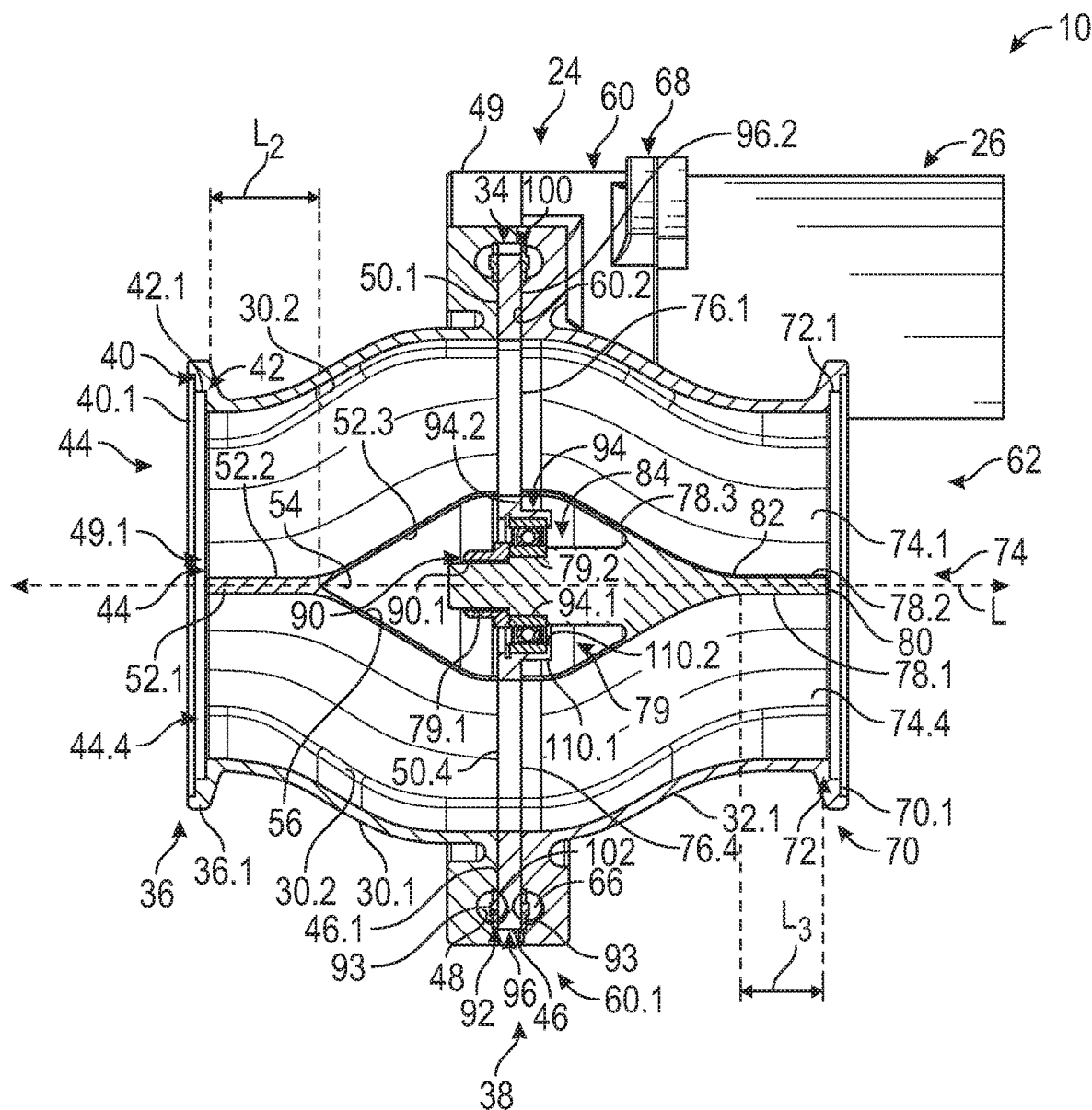
FIG. 3 is a cross-sectional view of the rotary plate valve system of FIG. 2, taken along line 3-3 of FIG. 2.

With reference to FIGS. 2 and 3, the rotary plate valve system 10 is shown in greater detail. The rotary plate valve 24 includes a first valve body 30, a second valve body 32 and a plate assembly 34. The first valve body 30 includes a first end 36 and an opposite second end 38. The first end 36 is coupled to the bleed supply inlet duct 14 (FIG. 1) and the second end 38 is coupled to the second valve body 32. With reference to FIG. 3, the first end 36 includes a first flange 36.1 that is annular and surrounds the first end 36 of the first valve body 30. The first flange 36.1 defines a first counterbore 40 and second counterbore 42 that each extend about a perimeter or circumference of the first flange 36.1. The first counterbore 40 and the second counterbore 42 are defined through the first flange 36.1 and cooperate to enable a portion of the bleed supply inlet duct 14 (FIG. 1) to be received within and fluidly coupled to the first valve body 30. In one example, the first counterbore 40 defines a plurality of threads 40.1. The plurality of threads 40.1 threadably engage with a plurality of threads of the bleed supply inlet duct 14 (FIG. 1) to couple the bleed supply inlet duct 14 to the first valve body 30. It should be noted that the use of the first counterbore 40 and the second counterbore 42 for coupling the bleed supply inlet duct 14 (FIG. 1) to the rotary plate valve 24 is merely exemplary, any suitable technique may be employed to couple the bleed supply inlet duct 14 to the first valve body 30, including, but not limited to, one or more flanges, welding, mechanical fasteners, etc. The second counterbore 42 defines a common first inlet 42.1 for each of a first plurality of fluid channels 44 defined in the first valve body 30 from the first end 36 to the second end 38. An exterior surface 30.1 of the first valve body 30 is substantially smooth, and is shaped to correspond with the shape of the first plurality of fluid channels 44. In one example, the exterior surface 30.1 tapers from the second end 38 toward the first end 36. The first valve body 30 has an interior surface 30.2 that is opposite the exterior surface 30.1.

Figure 4:
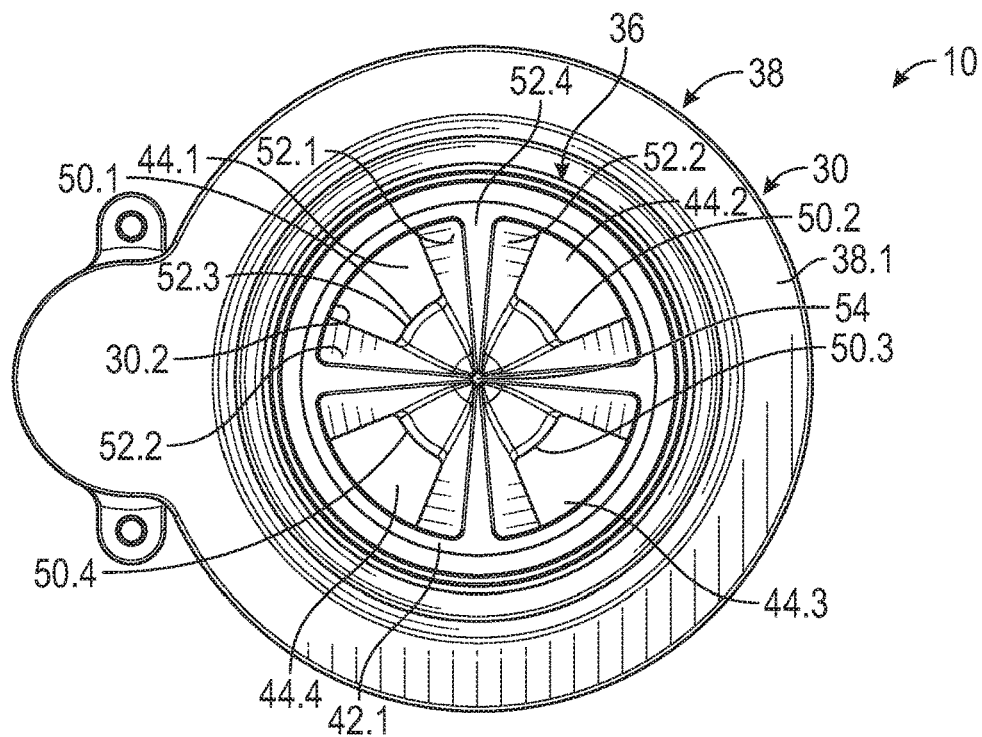
FIG. 4 is an end view of a first valve body of the rotary plate valve of the rotary plate valve system of FIG. 2.

The second end 38 defines a second annular flange 38.1 (FIG. 4). The second annular flange 38.1 defines a third counterbore 46 and a first bearing groove 48 that each extend about a perimeter or circumference of the second annular flange 38.1. The third counterbore 46 defines a recess within the second end 38 for receiving a portion of the plate assembly 34. The first bearing groove 48 is defined within a surface 46.1 of the third counterbore 46, and receives a portion of the plate assembly 34. The second end 38 may also define a gear housing portion 49. The gear housing portion 49 is substantially cylindrical, and extends outwardly from the exterior surface 30.1 of the first valve body 30. The gear housing portion 49 receives a portion of the plate assembly 34 to couple the plate assembly 34 to the actuator 26.

The first plurality of fluid channels 44 is defined within the first valve body 30 from the first end 36 to the second end 38. In this example, with reference to FIG. 4, the first valve body 30 includes four first fluid channels 44.1-44.4. Each of the first fluid channels 44.1-44.4 are spaced apart about a perimeter or circumference of the first valve body 30. Each of the first fluid channels 44.1-44.4 includes the common first inlet 42.1 and a respective first outlet 50.1-50.4. As will be discussed, each of the first outlets 50.1-50.4 are selectively in fluid communication with the second valve body 32 based on a position of the plate assembly 34.

With reference to FIG. 4, each of the first fluid channels 44.1-44.4 is defined by a pair of sidewalls 52.1, 52.2, a conical flange 52.3 and the interior surface 30.2. The sidewalls 52.1, 52.2 of adjacent ones of the first fluid channels 44.1-44.4 are interconnected via a rib 52.4. Generally, the sidewalls 52.1, 52.2 cooperate to form a substantially triangular shape that extends from the first end 36 to the conical flange 52.3. In one example, the sidewalls 52.1, 52.2 are coupled to the conical flange 52.3 downstream from the common first inlet 42.1. In this example, with reference to FIG. 3, the sidewalls 52.1, 52.2 form a common wall 53 that extends along a length L2 from the common first inlet 42.1 to a divergence point 54 defined at the conical flange 52.3. The divergence point 54 is selected to provide reduced fluid and pressure losses as the fluid flows through the first valve body 30 into the second valve body 32. In one example, the divergence point 54 is about 0.5 inches (in.) (25.4 millimeters (mm.)) downstream from the common first inlet 42.1 at the first end 36. Generally, the divergence point 54 may be located between the common first inlet 42.1 and any location downstream of common first inlet 42.1 within the first valve body 30 based on the specific installation environment of the rotary plate valve 24. By diverging at the divergence point 54 defined by the conical flange 52.3, the first fluid channels 44.1-44.4 also enable a portion of the plate assembly 34 to be received within the second end 38 of the first valve body 30. In this regard, the conical flange 52.3 defines a first cavity 56 within the second end 38 of the first valve body 30. The first cavity 56 is surrounded by the first fluid channels 44.1-44.4 and enables the receipt of a portion of the plate assembly 34.

The first fluid channels 44.1-44.4 diverge outwardly or away from a longitudinal axis L defined through the rotary plate valve 24. Each of the first fluid channels 44.1-44.4 are bounded by the sidewalls 52.1, 52.2 and the interior surface 30.2 such that downstream from the common inlet 42.1, each of the first fluid channels 44.1-44.4 is fluidly isolated from or separate from a remainder of the first fluid channels 44.1-44.4. Stated another way, the first fluid channels 44.1-44.4 define discrete fluid channels downstream from the common inlet 42.1 such that fluid downstream from the common inlet 42.1 does not mix between the first fluid flow channels 44.1-44.4. In this example, the first outlets 50.1-50.4 are defined at the second end 38 of the first valve body 30. Generally, each of the first outlets 50.1-50.4 is discrete, such that fluid flowing through the respective first fluid channels 44.1-44.4 exits the respective first fluid channel 44.1-44.4 at the respective first outlet 50.1-50.4. Each of the first outlets 50.1-50.4 is selectively in fluid communication with respective ones of a second plurality of fluid channels 74 defined in the second valve body 32.

The second valve body 32 includes a third end 60 and an opposite fourth end 62. The third end 60 is coupled to the first valve body 30 and the fourth end 62 is coupled to the outlet duct 22 (FIG. 1). With reference to FIG. 3, the third end 60 defines a third annular flange 60.1. The third annular flange 60.1 defines a second bearing groove 66 that extends about a perimeter or circumference of the third annular flange 60.1. The second bearing groove 66 is defined within a surface 60.2 of the third annular flange 60.1, and receives a portion of the plate assembly 34. The third end 60 may also define a second actuator housing portion 68. The second actuator housing portion 68 is substantially cylindrical, and extends outwardly from an exterior surface 32.1 of the second valve body 32. The second actuator housing portion 68 is hollow for receiving a portion of the actuator 26 to couple the actuator 26 to the rotary plate valve 24. In one example, the second actuator housing portion 68 includes a pair of flanges 69, which each define a throughbore 69.1. The flanges 69 receive a mechanical fastener therethrough, such as a bolt, screw, etc. to couple the actuator 26 to the rotary plate valve 24.

The fourth end 62 includes a fourth flange 62.1 that is annular and surrounds the fourth end 62 of the second valve body 32. The fourth flange 62.1 defines a fourth counterbore 70 and a fifth counterbore 72 that each extend about a perimeter or circumference of the fourth flange 62.1. The fourth counterbore 70 and the fifth counterbore 72 are defined through the fourth flange 62.1 and cooperate to enable a portion of the outlet duct 22 (FIG. 1) to be received within and fluidly coupled to the fourth flange 62.1. In one example, the fourth counterbore 70 defines a plurality of threads 70.1. The plurality of threads 70.1 threadably engage with a plurality of threads of the outlet duct 22 (FIG. 1) to couple the outlet duct 22 to the second valve body 32. It should be noted that the use of the fourth counterbore 70 and the fifth counterbore 72 for coupling the outlet duct 22 (FIG. 1) to the rotary plate valve 24 is merely exemplary, as any suitable technique may be employed to couple the second valve body 32 to the outlet duct 22, including, but not limited to, one or more flanges, welding, mechanical fasteners, etc. In this example, the fifth counterbore 72 defines a common second outlet 72.1 for each of a second plurality of fluid channels 74 defined in the second valve body 32 from the third end 60 to the fourth end 62. The exterior surface 32.1 of the second valve body 32 is substantially smooth, and is shaped to correspond with the shape of the second plurality of fluid channels 74. In one example, the exterior surface 32.1 tapers from the third end 60 toward the fourth end 62. The second valve body 32 has an interior surface 32.2 that is opposite the exterior surface 32.1.

The second plurality of fluid channels 74 is defined within the second valve body 32 from the third end 60 to the fourth end 62. In this example, with reference to FIG. 5, the second valve body 32 includes four second fluid channels 74.1-74.4, which each correspond to one of the first fluid channels 44.1-44.4. Each of the second fluid channels 74.1-74.4 are spaced apart about a perimeter or circumference of the second valve body 32. Each of the second fluid channels 74.1-74.4 includes a respective second inlet 76.1-76.4 and the common second outlet 72.1. As will be discussed, each of the second inlets 76.1-76.4 are selectively in fluid communication with the first valve body 30 based on a position of the plate assembly 34.

Figure 5:
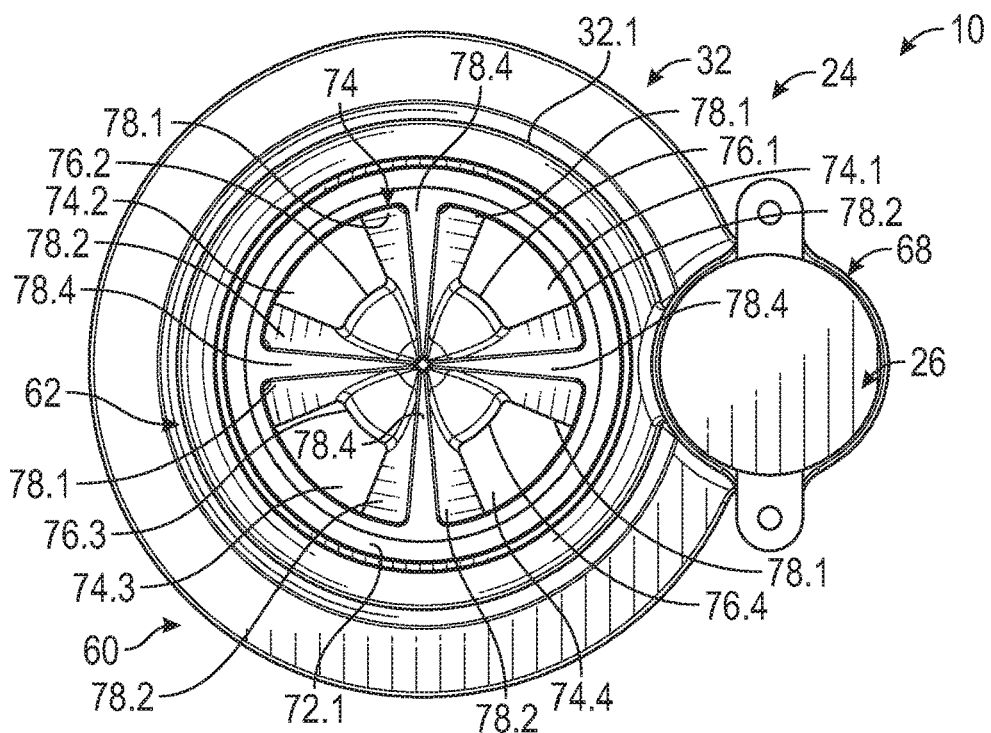
FIG. 5 is an end view of a second valve body of the rotary plate valve of the rotary plate valve system of FIG. 2.

With reference to FIG. 5, each of the second fluid channels 74.1-74.4 is defined by a pair of sidewalls 78.1, 78.2, a second conical flange 78.3 (FIG. 1) and the interior surface 32.2. The sidewalls 78.1, 78.2 of adjacent ones of the second fluid channels 74.1-74.4 are interconnected via a rib 78.4. Generally, the sidewalls 78.1, 78.2 and the respective rib 78.4 cooperate to form a substantially triangular shape that extends from the second conical flange 78.3 to the fourth end 62. In one example, the sidewalls 78.1, 78.2 and the ribs 78.4 are coupled to the second conical flange 78.3 at the third end 60 to define the second inlets 76.1-76.4. In this example, with reference to FIG. 3, the second conical flange 78.3 includes a shaft 79 defined internally within the second valve body 32. As will be discussed, the shaft 79 receives and is coupled to a portion of the plate assembly 34. In one example, the shaft 79 defines a plurality of threads 79.1 and a groove 79.2. The plurality of threads 79.1 matingly engages with a portion of the plate assembly 34 to couple the plate assembly 34 to the second valve body 32. The groove 79.2 receives a portion of the plate assembly 34 to couple the portion of the plate assembly 34 to the shaft 79.

The sidewalls 78.1, 78.2 downstream from the second conical flange 78.3 form a second common wall 80 that extends along a length L3 from a convergence point 82 defined at the second conical flange 78.3 to the common second outlet 72.1. The convergence point 82 is selected to provide reduced fluid and pressure losses as the fluid flows through the second valve body 32. In one example, the convergence point 82 is about 0.5 inches (in.) (25.4 millimeters (mm.)) upstream from the common second outlet 72.1 at the fourth end 62. Generally, the convergence point 82 may be located between the common second outlet 72.1 and any location downstream of common second outlet 72.1 within the second valve body 32 based on the specific installation environment of the rotary plate valve 24. By diverging prior to the convergence point 82, the second fluid channels 74.1-74.4 also enable a portion of the plate assembly 34 to be received within the third end 60 of the second valve body 32. In this regard, the second conical flange 78.3 defines a second cavity 84 within the third end 60 of the second valve body 32 that cooperates with the first cavity 56 of the first valve body 30 to receive a portion of the plate assembly 34. The second cavity 84 is surrounded by the second fluid channels 74.1-74.4. Generally, the second fluid channels 74.1-74.4 diverge outwardly or away from a longitudinal axis L defined through the rotary plate valve 24 prior to converging at the convergence point 82. Each of the second fluid channels 74.1-74.4 are bounded by the sidewalls 78.1, 78.2 and the interior surface 32.2 such that upstream from the common second outlet 72.1, each of the second fluid channels 74.1-74.4 is fluidly isolated from or separate from a remainder of the second fluid channels 74.1-74.4. Stated another way, the second fluid channels 74.1-74.4 define discrete fluid channels upstream from the common second outlet 72.1 such that fluid upstream from the common second outlet 72.1 does not mix between the second fluid channels 74.1-74.4. In this example, the second inlet 76.1-76.4 is defined at the third end 60 of the second valve body 32. Generally, each of the second inlets 76.1-76.4 is discrete, such that fluid flowing through the respective second fluid channels 74.1-74.4 enters the respective second fluid channels 74.1-74.4 at the respective second inlet 76.1-76.4. Each of the second inlets 76.1-76.4 is selectively in fluid communication with respective ones of the first outlets 50.1-50.4 defined in the first valve body 30 such that fluid from a respective one of the first fluid channels 44.1-44.4 flows into a respective one of the second fluid channels 74.1-74.4 based on a position of the plate assembly 34.

In one example, each of the first fluid channels 44.1-44.4 and the second fluid channels 74.1-74.4 have the same flowpath area. By providing the first fluid channels 44.1-44.4 and the second fluid channels 74.1-74.4 with the same flowpath area, flow and pressure losses are reduced as the fluid flows from the first fluid channels 44.1-44.4 into the second fluid channels 74.1.-74.4. In addition, each of the sidewalls 52.1, 52.2; 78.1, 78.2 include fillets along the interconnection of the respective sidewalls 52.1, 52.2; 78.1, 78.2, which reduces flow separation through each of the first fluid channels 44.1-44.4 and the second fluid channels 74.1-74.4. In addition, each leading edge of the sidewalls 52.1, 52.2 has a radius to provide for a smooth transition into the respective first fluid channel 44.1-44.4 from the common first inlet 42.1 to reduce flow losses. Further, each leading edge of the sidewalls 78.1, 78.2 has a radius to provide for a smooth transition into the respective second fluid channel 74.1-74.4 from the plate 96, thereby reducing flow losses.

In one example, each of the first fluid channels 44.1-44.4 and the second fluid channels 74.1-74.4 is integrally formed, monolithic or one-piece with the first valve body 30 and the second valve body 32, respectively. In this example, the first valve body 30 and the second valve body 32 are composed of a metal or metal alloy. Generally, the first valve body 30 and the second valve body 32 are composed of aluminum alloys or steel alloys depending upon the operating environment of the rotary plate valve 24. It should be noted that other metals or metal alloys may be employed, based on the particular operating environment for the rotary plate valve 24. In one example, in order to manufacture the first valve body 30 and the second valve body 32 including the first fluid channels 44.1-44.4 and the second fluid channels 74.1-74.4, respectively, a core that defines the first valve body 30 including the first fluid channels 44.1-44.4 is cast, molded or printed from a ceramic material; and a core that defines the second valve body 32 including the second fluid channels 74.1-74.4 is cast, molded or printed from a ceramic material. In this example, the core is manufactured from a ceramic using ceramic additive manufacturing or selective laser sintering. With the core formed, the core is positioned within a die. With the core positioned within the die, the die is injected with liquid wax such that liquid wax surrounds the core. A wax sprue or conduit may also be coupled to the cavity within the die to aid in the formation of the first valve body 30 and the second valve body 32. Once the wax has hardened to form a wax pattern, the wax pattern is coated or dipped in ceramic to create a ceramic mold about the wax pattern. After coating the wax pattern with ceramic, the wax pattern may be subject to stuccoing and hardening. The coating, stuccoing and hardening processes may be repeated until the ceramic mold has reached the desired thickness.

With the ceramic mold at the desired thickness, the wax is heated to melt the wax out of the ceramic mold. With the wax melted out of the ceramic mold, voids remain surrounding the core, and the ceramic mold is filled with molten metal or metal alloy. In one example, the molten metal is poured down an opening created by the wax sprue. It should be noted, however, that vacuum drawing may be used to fill the ceramic mold with the molten metal. Once the metal or metal alloy has solidified, the ceramic is removed from the metal or metal alloy, through chemical leaching, for example, leaving the first fluid channels 44.1-44.4 formed in the first valve body 30 and the second fluid channels 74.1-74.4 formed in the second valve body 32. It should be noted that alternatively, the first fluid channels 44.1-44.4 and the second fluid channels 74.1-74.4 may be formed in the first valve body 30 and the second valve body 32, respectively, using conventional dies with one or more portions of the core (or portions adjacent to the core) comprising a fugitive core insert. As a further alternative, the first valve body 30 and the second valve body 32 including the first fluid channels 44.1-44.4 and the second fluid channels 74.1-74.4, respectively, may be formed using other additive manufacturing processes, including, but not limited to, direct metal laser sintering. It should be noted that the use of four of the first fluid channels 44.1-44.4 and the second fluid channels 74.1-74.4 is merely exemplary, as the first valve body 30 and the second valve body 32 may define any number of corresponding fluid channels.

Figure 6:
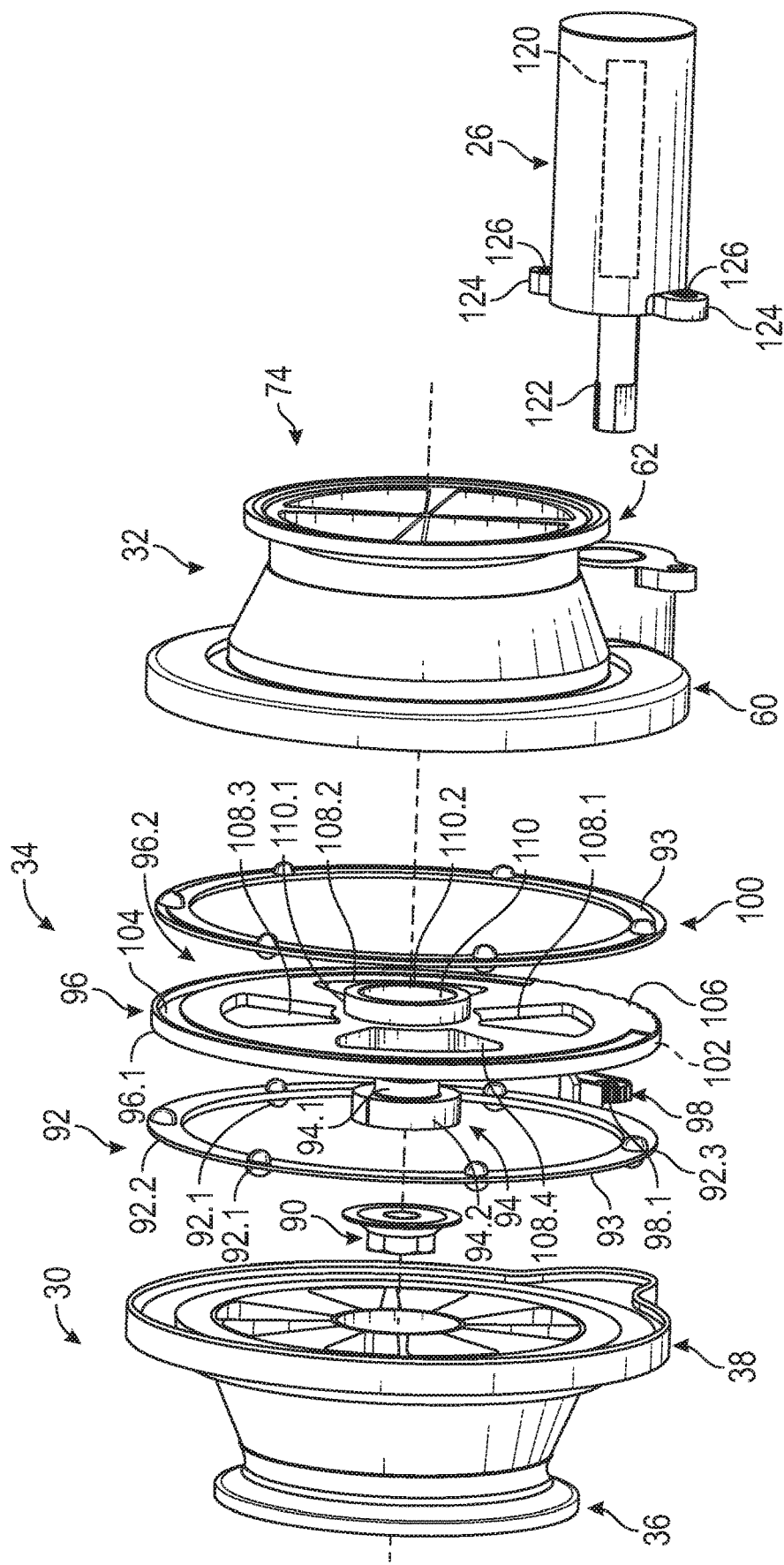
FIG. 6 is an expanded view of the rotary plate valve system of FIG. 2.

With reference to FIG. 6, the plate assembly 34 is shown expanded from the first valve body 30 and the second valve body 32. In one example, the plate assembly 34 includes a coupling member 90, a first bearing ring 92, a bearing 94, a plate 96, a gear 98 and a second bearing ring 100. It should be noted that while plate assembly 34 is described and illustrated herein as including the first bearing ring 92, the bearing 94 and the second bearing ring 100, the plate assembly 34 may include one or more bushing rings, bushings, or other devices that enable rotation of the plate 96 relative to the first valve body 30 and the second valve body 32.

The coupling member 90 couples and retains the plate assembly 34 on the second valve body 32. In one example, the coupling member 90 is a flange nut having a plurality of threads 90.1 that matingly engage with the plurality of threads 79.1 of the shaft 79 (FIG. 3). The coupling member 90 retains the bearing 94, and thus, the plate 96, the first bearing ring 92 and the second bearing ring 100 on the shaft 79 of the second valve body 32. The coupling member 90 may be composed of a metal, metal alloy or polymer, and may be cast, forged, stamped or formed with additive manufacturing, including, but not limited to, direct metal laser sintering.

The first bearing ring 92 facilitates the rotation of the plate 96 relative to the first valve body 30. The first bearing ring 92 includes a plurality of ball bearings 92.1, which are coupled to a ring body 92.2. Generally, the plurality of ball bearings 92.1 are coupled to the ring body 92.2 so as to spaced apart about a perimeter or circumference of the ring body 92.2. The plurality of ball bearings 92.1 are positioned within the first bearing groove 48 defined in the second end 38 of the first valve body 30, and roll within a first plate bearing groove 102 (FIG. 3) defined in a first side 96.1 of the plate 96. The plurality of ball bearings 92.1 and the ring body 92.2 may be composed of a metal, metal alloy or polymer, and may be stamped, forged, cast, etc. Once the ring body 92.2 is formed, each of the ball bearings 92.1 may be coupled to the ring body 92.2. The ring body 92.2 may also include an arcuate relief 92.3 about a portion of the perimeter of the ring body 92.2 to provide clearance for the engagement between the plate 96 and the gear 98. The ring body 92.2 may also include a seal 93 on the side of the ring body 92.2 that faces the first valve body 30 (FIG. 3). Generally, the seal 93 extends axially outward from the ring body 92.2 between adjacent ones of the plurality of ball bearings 92.1 to inhibit fluid flow through the first bearing ring 92.

The bearing 94 is received within the groove 79.2 of the shaft 79 and is coupled to the plate 96. In one example, the bearing 94 is a ball bearing, with an inner race 94.1 coupled to the groove 79.2 on the shaft 79 (FIG. 3) and an outer race 94.2 coupled to the plate 96 (FIG. 3). It should be noted that the bearing 94 may also comprise a roller bearing, if desired.

The plate 96 is circular, and includes the first side 96.1 and an opposite second side 96.2. The plate 96 is coupled between the first valve body 30 and the second valve body 32. The first side 96.1 includes the first plate bearing groove 102 defined about a majority of a perimeter or circumference of the first side 96.1, and faces the second end 38 of the first valve body 30. The second side 96.2 includes a second plate bearing groove 104 defined about a majority of a perimeter or circumference of the second side 96.2, and faces the third end 60 of the second valve body 32. In this regard, the plate 96 also defines a plurality of plate gear teeth 106, a plurality of openings 108 and a central opening 110. The plurality of plate gear teeth 106 are defined along the perimeter or circumference of the plate 96 and interrupt the first plate bearing groove 102 and the second plate bearing groove 104. The plurality of plate gear teeth 106 meshingly engage with the gear 98 to enable the plate 96 to be driven or rotated by the actuator 26. Generally, the plurality of plate gear teeth 106 extend along the perimeter of the plate 96 for a predetermined arc length that allows for the correct timing of the rotation of the plate 96 and allows for the predetermined rotational angle needed to open each of the second fluid channels 74.1-74.4. Generally, the arc length is predetermined based on the number of flow paths incorporated into the rotary plate valve 24.

The plurality of openings 108 are defined through the plate 96 from the first side 96.1 to the second side 96.2. The plurality of openings 108 are spaced apart about the perimeter or circumference of the plate 96. Generally, each of the plurality of openings 108 corresponds to one of the first fluid channels 44.1-44.4 and one of the second fluid channels 74.1-74.4. Thus, in this example, with reference to FIG. 7, the plate 96 includes four openings 108.1-108.4, which each have the same flowpath area as the first fluid channels 44.1-44.4 and the second fluid channels 74.1-74.4. The openings 108.1-108.4 are sized such that a section 109.1-109.4 of the plate 96 between adjacent ones of the openings 108.1-108.4 is the same size as the adjacent opening 108.1-108.4. This provides for the second, closed position of the rotary plate valve 24. Stated another way, the sections 109.1-109.4 are sized to completely obstruct the flow of fluid between the first fluid channels 44.1-44.4 and the second fluid channels 74.1-74.4, thereby providing the second, closed position of the rotary plate valve 24. When the openings 108.1-108.4 are fully or completely aligned with the first fluid channels 44.1-44.4 and the second fluid channels 74.1-74.4, the rotary plate valve 24 is in the first, open position such that fluid flows from the first fluid channels 44.1-44.4 into and through the second fluid channels 74.1-74.4.

The openings 108.1-108.4 are shaped to correspond with the shape of the first outlets 50.1-50.4 and the second inlets 76.1-76.4. In one example, each of the openings 108.1-108.4 is defined by a first arc segment 112, an opposite second arc segment 114 and a pair of radial segments 116.1, 116.2. The first arc segment 112 is radially inward from the second arc segment 114. The second arc segment 114 extends along an arc that is greater than an arc of the first arc segment 112. The pair of radial segments 116.1, 116.2 interconnect the first arc segment 112 and the second arc segment 114.

With reference to FIG. 3, the central opening 110 includes a flange 110.1 that couples the plate 96 to the bearing 94. The flange 110.1 extends axially from the second side 96.2 about the circumference of the central opening 110. The flange 110.1 includes a lip 110.2, which retains the plate 96 on the bearing 94. The plate 96 is composed of a metal or metal alloy, and may be cast, forged, stamped or formed with additive manufacturing, including, but not limited to, direct metal laser sintering.

With reference to FIG. 6, the gear 98 is coupled to the actuator 26 and is driven by the actuator 26 to move or drive the plate 96. The gear 98 is retained within the gear housing portion 49. The gear 98 includes a plurality of gear teeth 98.1 defined about a perimeter or circumference of the gear 98. The plurality of gear teeth 98.1 meshingly engage with the plurality of plate gear teeth 106 of the plate 96 to move or drive the plate 96. In one example, the gear 98 is a spur gear; however, the gear 98 may have different configurations based on the orientation of the gear 98 relative to the plate 96. The gear 98 is composed of a metal or metal alloy, and may be cast, forged, stamped, etc.

Figure 7:
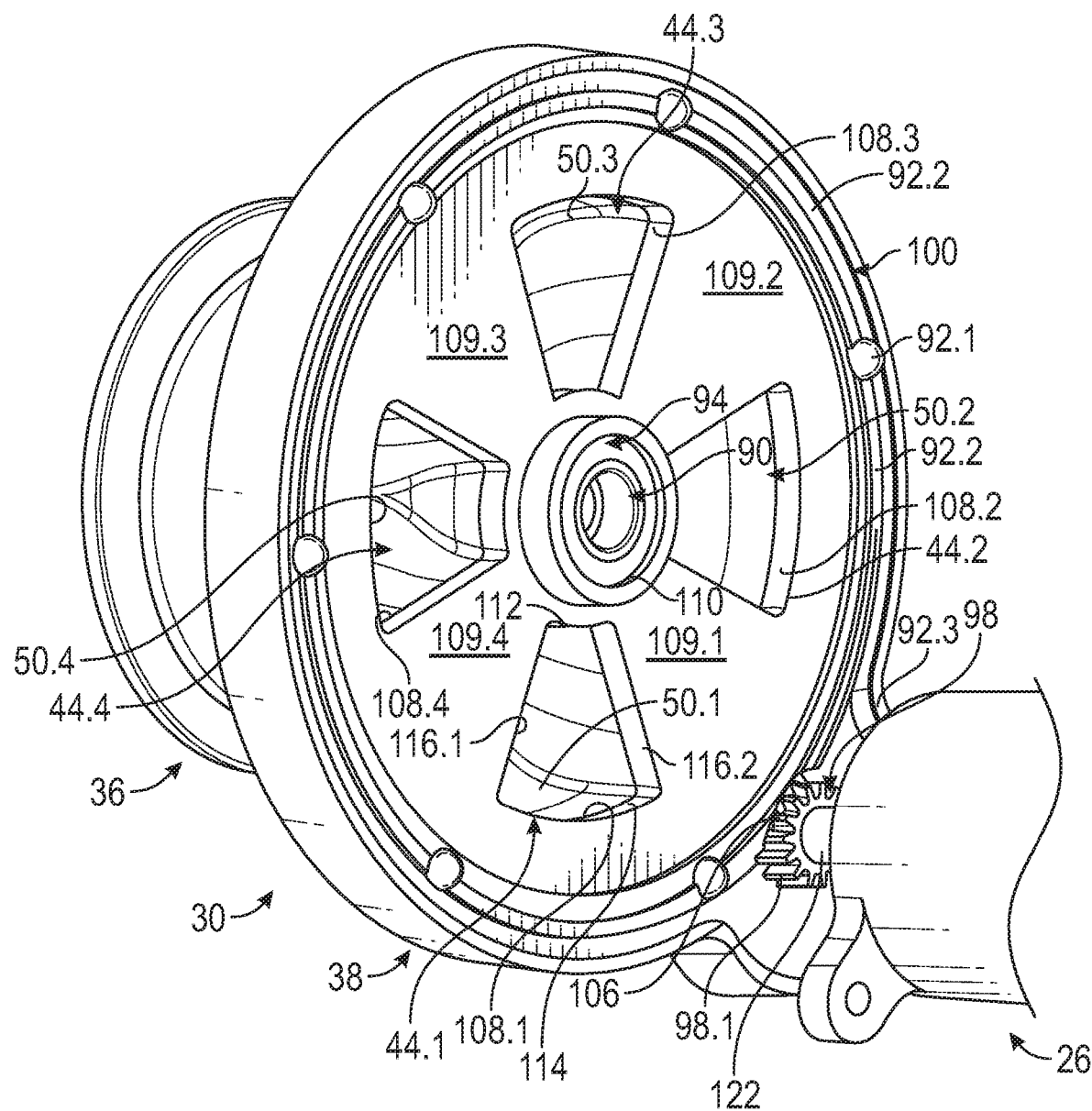
FIG. 7 is a perspective view of a portion of a plate assembly of the rotary plate valve of the rotary plate valve system of FIG. 2.

The second bearing ring 100 facilitates the rotation of the plate 96 relative to the second valve body 32. As the second bearing ring 100 is substantially the same as the first bearing ring 92, the second bearing ring 100 will not be discussed in detail herein. The second bearing ring 100 includes the plurality of ball bearings 92.1, which are coupled to the ring body 92.2. The ring body 92.2 may also include the arcuate relief 92.3 about a portion of the perimeter of the ring body 92.2 to provide clearance for the engagement between the plate 96 and the gear 98 (FIG. 7). The ring body 92.2 may also include the seal 93 on the side of the ring body 92.2 that faces the second valve body 32 (FIG. 3). The plurality of ball bearings 92.1 of the second bearing ring 100 are positioned within the second bearing groove 66 defined in the third end 60 of the second valve body 32, and roll within the second plate bearing groove 104 defined in the second side 96.2 of the plate 96.

The actuator 26 is in communication with the controller 28 (FIG. 1) to receive one or more control signals to drive the gear 98, and thus, the plate 96 between the first, open position, the second, closed position and positions in-between. The actuator 26 includes a motor 120 and an output shaft 122. The motor 120 may comprise a suitable electric motor that is responsive to the controller 28 (FIG. 1). Generally, the motor 120 is in communication with the controller 28 (FIG. 1) and is responsive to the one or more control signals to rotate the output shaft 122 in a clockwise or counterclockwise direction for a predefined period. In one example, the one or more control signals command the rotation of the output shaft 122 for a predefined period of time, which corresponds to a desired angular movement of the plate 96. It should be noted that other techniques may be employed to rotate the plate 96 with the actuator 26. The output shaft 122 is fixedly coupled to the gear 98 such that the gear 98 rotates with the output shaft 122. The rotation of the gear 98 clockwise or counterclockwise by the output shaft 122 rotates the plate 96 relative to the first valve body 30 and the second valve body 32. The actuator 26 may also include a pair of mating flanges 124. The mating flanges 124 each include a throughbore 126, which receives mechanical fasteners for coupling the actuator 26 to the rotary plate valve 24. It should be noted that the use of the pair of mating flanges 124 is merely exemplary, as any suitable technique may be used to couple the actuator 26 to the rotary plate valve 24.

With reference to FIG. 1, the controller 28 includes at least one processor 130 and a computer readable storage device or media 132. The processor 130 can be any custom made or commercially available processor, a central processing unit (CPU), a graphics processing unit (GPU), an auxiliary processor among several processors associated with the controller 28, a semiconductor based microprocessor (in the form of a microchip or chip set), a macroprocessor, any combination thereof, or generally any device for executing instructions. The computer readable storage device or media 132 may include volatile and nonvolatile storage in read-only memory (ROM), random-access memory (RAM), and keep-alive memory (KAM), for example. KAM is a persistent or nonvolatile memory that may be used to store various operating variables while the processor 130 is powered down. The computer-readable storage device or media 132 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 28 in controlling components associated with the rotary plate valve system 10.

The instructions may include one or more separate programs, each of which comprises an ordered listing of executable instructions for implementing logical functions. The instructions, when executed by the processor 130, receive and process input signals, perform logic, calculations, methods and/or algorithms for controlling the components of the rotary plate valve system 10 of the aircraft 12, and generate control signals to the actuator 26 of the rotary plate valve system 10 to control a position of the plate 96 based on the logic, calculations, methods, and/or algorithms. Although only one controller 28 is shown in FIG. 1, embodiments of the aircraft 12 may include any number of controllers 28 that communicate over any suitable communication medium or a combination of communication mediums and that cooperate to process the sensor signals, perform logic, calculations, methods, and/or algorithms, and generate control signals to control features of the rotary plate valve system 10.

In various embodiments, one or more instructions of the controller 28 are associated with the rotary plate valve system 10 and, when executed by the processor 130, the instructions output one or more control signals to the actuator 26 to move the plate 96, and thus, the rotary plate valve 24 between the first, open position, the second, closed position and positions in-between. In various embodiments, a rotary valve control system may include one or more control modules embedded within the controller 28 for controlling the actuator 26. The rotary valve control system may include a closed or an open loop control methodology that controls the actuator 26 to move the plate 96 to a predetermined position based on input signals received from various sensors or systems associated with the aircraft 12, or in other embodiments, the rotary valve control system may be an internal open loop control system that controls the actuator 26 based on input received to the rotary valve control system. In certain embodiments, the rotary valve control system may comprise a combination of the two. Due to the nature and capability of the rotating plate 96, the actuator 26 can be used to modulate the position of the plate 96 such that a modulated fluid flow results from the exit of the rotary plate valve 24.

In one example, in order to assemble the rotary plate valve system 10, with the second valve body 32 formed and the second bearing ring 100 formed and assembled, the second bearing ring 100 is positioned within the second bearing groove 66 of the second valve body 32 such that the seal 93 is against the second valve body 32. With the plate 96 formed, the bearing 94 is positioned within the plate 96 so that it abuts the lip 110.2 of the flange 110.1. The plate 96 with the bearing 94 is positioned about the shaft 79, and the coupling member 90 is coupled to the shaft 79 such that the plurality of threads 90.1 threadably engage with the plurality of threads 79.1 of the shaft 79 to retain the plate 96 on the shaft 79. With the first bearing ring 92 formed and assembled, the first bearing ring 92 is coupled to the first valve body 30 so that the seal 93 is positioned against the first bearing groove 48 of the first valve body 30. The first valve body 30 is coupled to the second valve body 32. With the gear 98 formed, the gear 98 is positioned within the gear housing portion 49 of the first valve body 30 such that the plurality of gear teeth 98.1 mesh with the plurality of plate gear teeth 106 of the plate 96. The output shaft 122 is inserted through the second actuator housing portion 68 of the second valve body 32 and is fixedly coupled to the gear 98, via a press-fit, for example. With the throughbores 126 of the mating flanges 124 coaxially aligned with the throughbores 69.1 of the flanges 69 of the second actuator housing portion 68 of the second valve body 32, the mechanical fasteners are inserted to couple the actuator 26 to the rotary plate valve 24.

Figure 8:
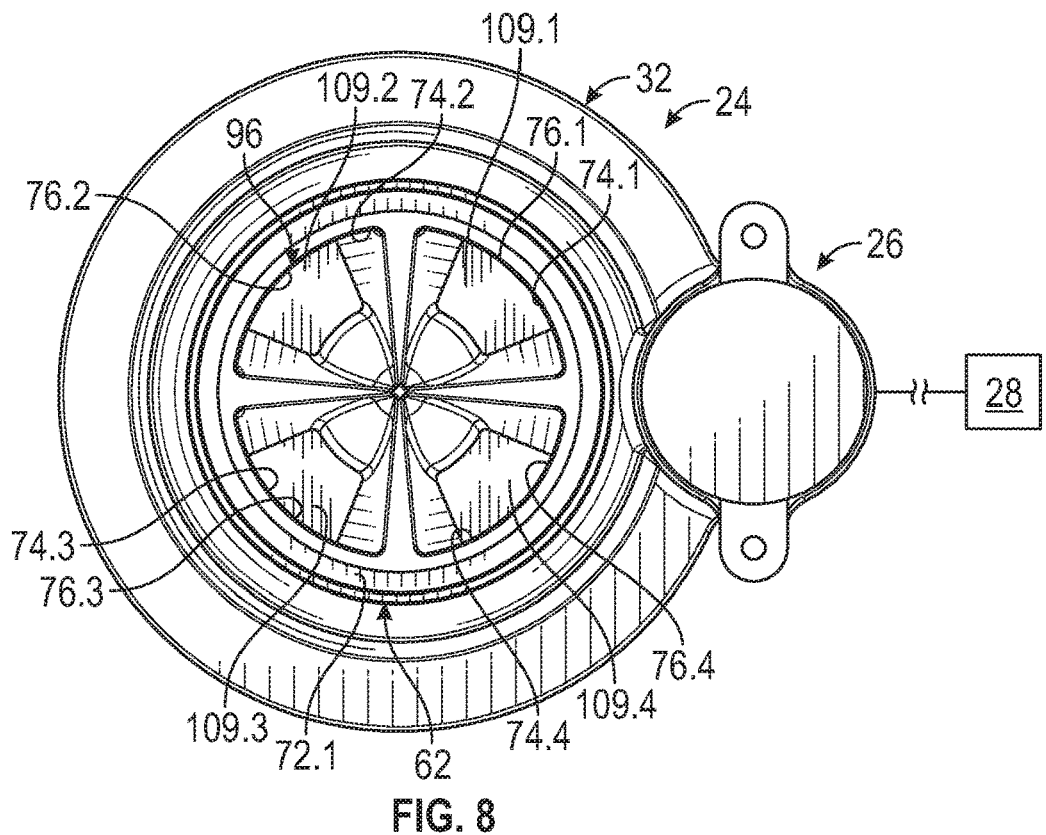
FIG. 8 is an end view of the second valve body of the rotary plate valve of FIG. 2, in which the rotary plate valve is in a second, closed position (0% open position)
Figure 8A:
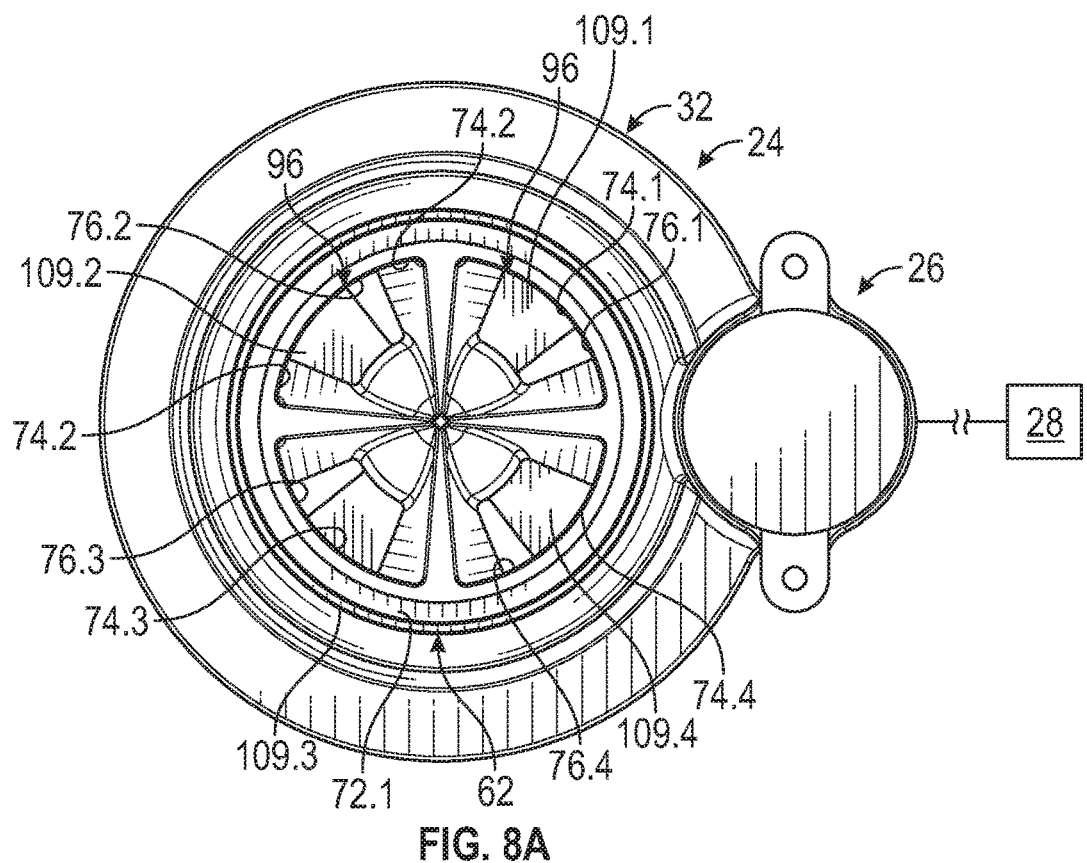
FIG. 8A is an end view of the second valve body of the rotary plate valve of FIG. 2, in which the rotary plate valve is in about a 25% open position.

With the rotary plate valve system 10 assembled, in the example of FIG. 1, the bleed supply inlet duct 14 is coupled to the first end 36 of the first valve body 30, and the outlet duct 22 is coupled to the fourth end 62 of the second valve body 32. The actuator 26 is placed in communication with the controller 28 via a communication architecture that enables the transfer of commands, power, data, etc., such as a bus. Initially, the rotary plate valve system 10 is in the second, closed position, as shown in FIG. 8. Based on the receipt of one or more control signals from the controller 28, the motor 120 drives the output shaft 122 to rotate the gear 98 (FIG. 6) in a clockwise direction to move the plate 96 and thus, the rotary plate valve 24 toward the first, open position. In one example, upon receipt of one or more control signals to move the rotary plate valve 24 to about a 25% open position, with reference to FIG. 8A, the actuator 26 rotates the gear 98 (FIG. 7) clockwise for a predetermined rotational angle that corresponds to a movement of the plate 96 that results in about a 75% blockage or obstruction of flow through the respective second inlets 76.1-76.4. Stated another way, the actuator 26 rotates the gear 98 clockwise to move the plate 96 such that the sections 109.1-109.4 obscure or cover about 75% of each of the respective second inlets 76.1-76.4, as shown in FIG. 8A. In the 25% open position, the rotary plate valve 24 provides modulated fluid flow from the bleed supply inlet duct 14 to the outlet duct 22.

Figure 8B:
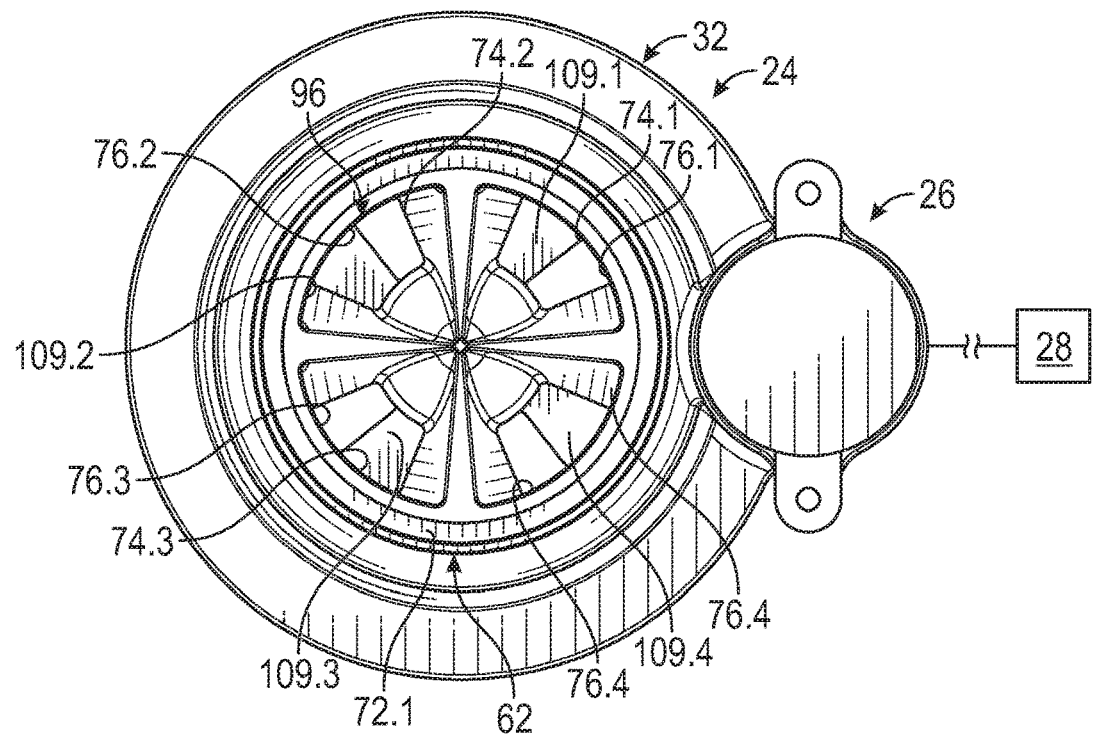
FIG. 8B is an end view of the second valve body of the rotary plate valve of FIG. 2, in which the rotary plate valve is in about a 50% open position.

In another example, with reference to FIG. 8B, based on the receipt of one or more control signals from the controller 28, the motor 120 drives the output shaft 122 to rotate the gear 98 in a clockwise direction to move the plate 96 and thus, the rotary plate valve 24 to about a 50% open position. In this example, the actuator 26 rotates the gear 98 (FIG. 7) clockwise for a predetermined rotational angle that corresponds to a movement of the plate 96 that results in about a 50% blockage or obstruction of flow through the respective second inlets 76.1-76.4. Stated another way, the actuator 26 rotates the gear 98 clockwise to move the plate 96 such that the sections 109.1-109.4 obscure or cover about 50% of each of the respective second inlets 76.1-76.4, as shown in FIG. 8B. In the 50% open position, the rotary plate valve 24 provides modulated fluid flow from the bleed supply inlet duct 14 to the outlet duct 22.

Figure 8C:
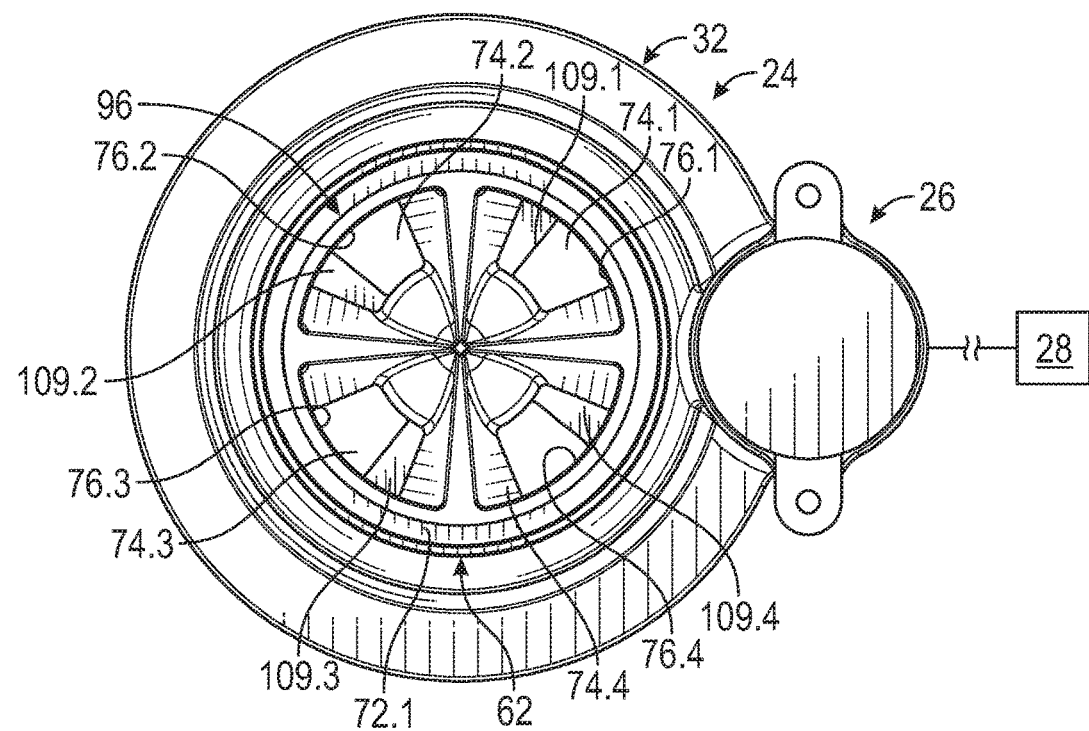
FIG. 8C is an end view of the second valve body of the rotary plate valve of FIG. 2, in which the rotary plate valve is in about a 75% open position.

In another example, with reference to FIG. 8C, based on the receipt of one or more control signals from the controller 28, the motor 120 drives the output shaft 122 to rotate the gear 98 in a clockwise direction to move the plate 96 and thus, the rotary plate valve 24 to about a 75% open position. In this example, the actuator 26 rotates the gear 98 (FIG. 7) clockwise for a predetermined rotational angle that corresponds to a movement of the plate 96 that results in about a 25% blockage or obstruction of flow through the respective second inlets 76.1-76.4. Stated another way, the actuator 26 rotates the gear 98 clockwise to move the plate 96 such that the sections 109.1-109.4 obscure or cover about 25% of each of the respective second inlets 76.1-76.4, as shown in FIG. 8C. In the 75% open position, the rotary plate valve 24 provides modulated fluid flow from the bleed supply inlet duct 14 to the outlet duct 22.

Figure 8D:
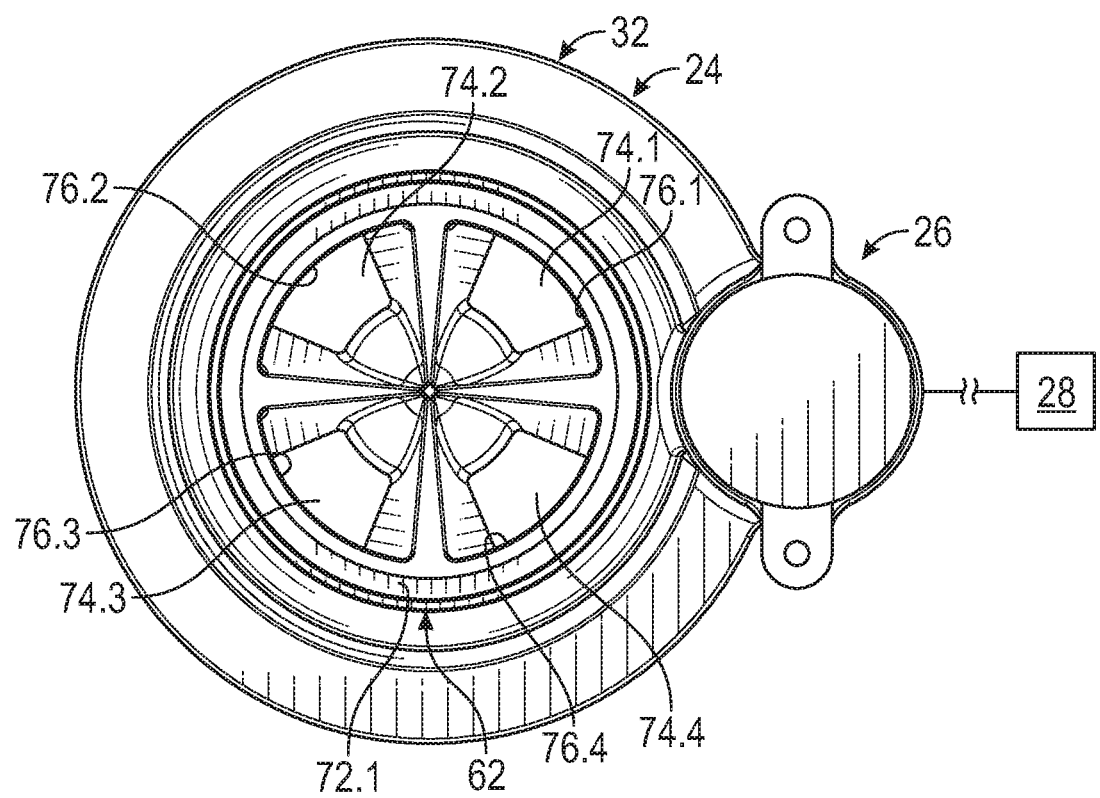
FIG. 8D is an end view of the second valve body of the rotary plate valve of FIG. 2, in which the rotary plate valve is in a first, open position (100% open position)

As a further example, with reference to FIG. 8D, based on the receipt of one or more control signals from the controller 28, the motor 120 drives the output shaft 122 to rotate the gear 98 in a clockwise direction to move the plate 96 and thus, the rotary plate valve 24 to the first, open position. In this example, the actuator 26 rotates the gear 98 (FIG. 7) clockwise for a predetermined rotational angle that corresponds to a movement of the plate 96 that results in about a 0% blockage or obstruction of flow through the respective second inlets 76.1-76.4. Stated another way, the actuator 26 rotates the gear 98 clockwise to move the plate 96 such that the sections 109.1-109.4 are hidden and do not cover the respective second inlets 76.1-76.4. Thus, in the first, open position, each of the second inlets 76.1-76.4 are unobstructed by the sections 109.1-109.4 and the rotary plate valve 24 is 100% open such that the first outlets 50.1-50.4 are in complete fluid communication with the second inlets 76.1-76.4. In the first, open position, the rotary plate valve 24 provides full fluid flow from the bleed supply inlet duct 14 to the outlet duct 22.

In addition, based on the receipt of one or more control signals from the controller 28, the motor 120 drives the output shaft 122 to rotate the gear 98 in a counterclockwise direction to move the plate 96 and thus, the rotary plate valve 24 toward the second, closed position. In the second, closed position, each of the second inlets 76.1-76.4 is completely obstructed by the sections 109.1-109.4 such that no fluid flows from the first outlets 50.1-50.4 to the second inlets 76.1-76.4, and the rotary plate valve 24 is 0% open (FIG. 8). In the second, closed position, the rotary plate valve 24 provides substantially zero fluid flow from the bleed supply inlet duct 14 to the outlet duct 22. It should be noted that the clockwise movement of the gear 98 described herein is merely exemplary, as the gear 98 may also be configured to move in a counterclockwise direction to move the plate 96 to the selected position. Moreover, it should be understood that the plate 96 is actively movable by the actuator 26 via the controller 28 to any position between the second, closed position (FIG. 8) and the first, open position (FIG. 8D) based on a downstream consumer demand, which allows for infinitely variable flow to the downstream consumer due to the nature of the modulating capability of the rotary plate valve 24.

Thus, the rotary plate valve system 10 enables the control of fluid flow through the outlet duct 22 with the plate 96, which is rotatable by the actuator 26 to vary a supply of fluid into the outlet duct 22. The rotation of the plate 96 to adjust the rotary plate valve 24 between the first, open position, the second, closed position and positions in-between enables the use of a smaller actuator 26, thereby reducing a weight and a cost of the rotary plate valve system 10. Further, by providing the first fluid channels 44.1-44.4, the openings 108.1-108.4 and the second fluid channels 74.1-74.4 with the same flowpath area, flow and pressure losses through the rotary plate valve 24 are reduced when compared to a butterfly valve. In this example, the rotary plate valve 24 has half the pressure loss of a butterfly valve. In addition, the use of fillets and radiuses reduces flow separation as the fluid flows through the rotary plate valve 24. The use of the individual fluid channels (the first fluid channels 44.1-44.4 and the second fluid channels 74.1-74.4) provides for smooth transitions of fluid flow through the rotary plate valve 24 and minimizes areas of flow separation and re-circulation, thus, keeping the flow uniform and reducing the pressure losses. The rotary plate valve 24 leads to a simpler design, lower weight, smaller volume and allows for infinitely variable modulated fluid flow to the downstream consumer. In addition, it should be noted that while the second valve body 32 is shown coupled to the outlet duct 22, the orientation of the rotary plate valve 24 may be reversed, such that the second valve body 32 is coupled to the bleed supply inlet duct 14 and the first valve body 30 is coupled to the outlet duct 22, depending upon the desired orientation of the actuator 26.

Figure 9:
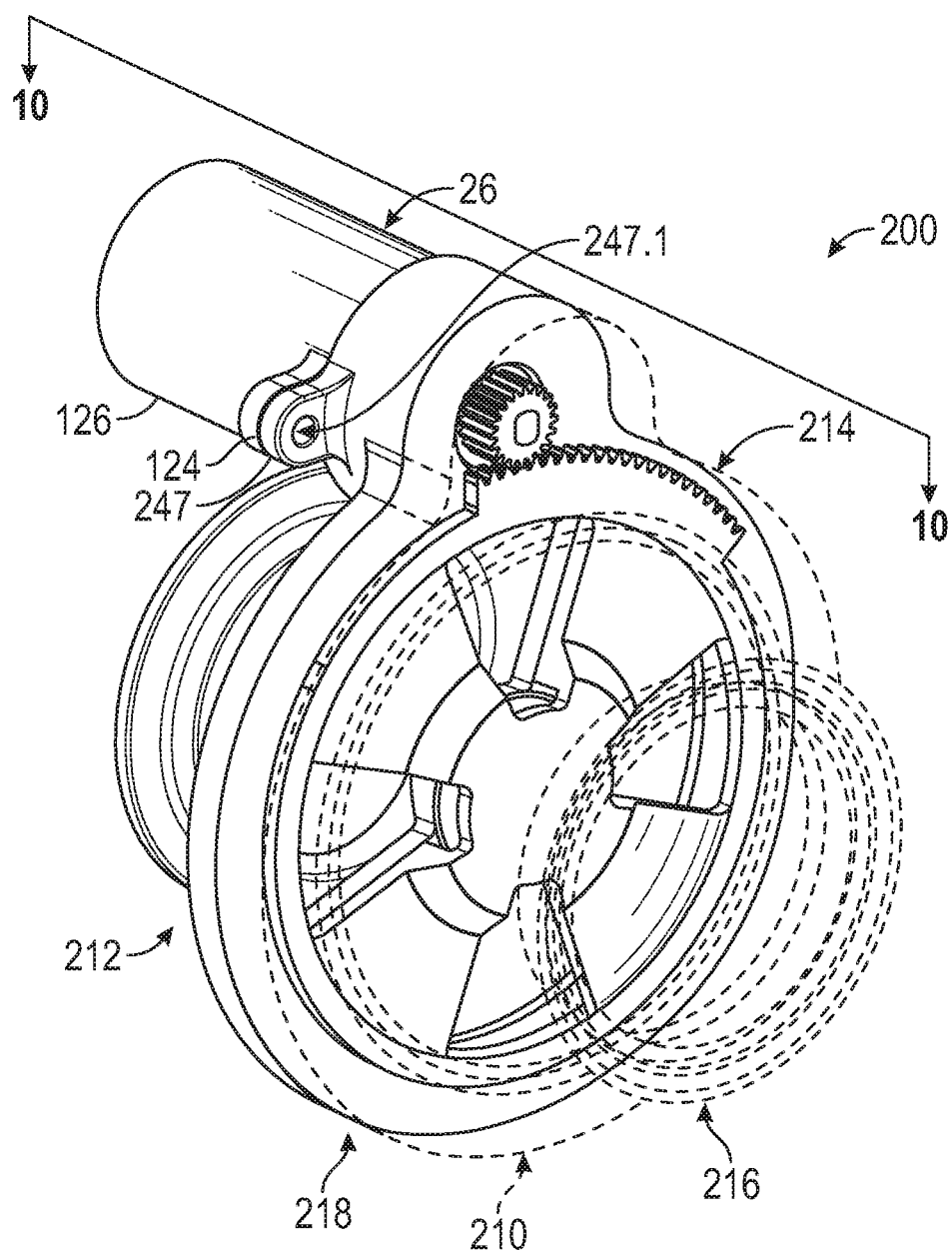
FIG. 9 is a perspective view of another exemplary rotary plate valve system having a rotary plate valve for use with the aircraft of FIG. 1.

It will be understood that the rotary plate valve system 10 described with regard to FIGS. 1-8D may be configured differently to provide control of the fluid flow into the outlet duct 22. In one example, with reference to FIG. 9, a rotary plate valve system 200 is shown. As the rotary plate valve system 200 includes components that are substantially similar to or the same as the rotary plate valve system 10 discussed with regard to FIGS. 1-8D, the same reference numerals will be used to denote the same or similar features. Similar to the rotary plate valve system 10 of FIG. 1, the rotary plate valve system 200 is coupled to and in fluid communication with the bleed supply inlet duct 14 to receive bleed fluid, such as bleed air. The bleed air is selectively provided by the rotary plate valve system 200 to other components or systems associated with the aircraft 20, such as the gas turbine engine 8, via the at least one outlet duct 22. The rotary plate valve system 200 includes a rotary plate valve 204 and the actuator 26. As discussed with regard to FIGS. 1-8D, the actuator 26 is responsive to one or more control signals from the controller 28 associated with the APU 18 or the aircraft 20 to move the rotary plate valve 204 to a first, open position (in which bleed air flows through the outlet duct 202), a second, closed position (in which bleed air does not flow through the outlet duct 202) and various positions in between the first, open position and the second closed position.

Figure 10:
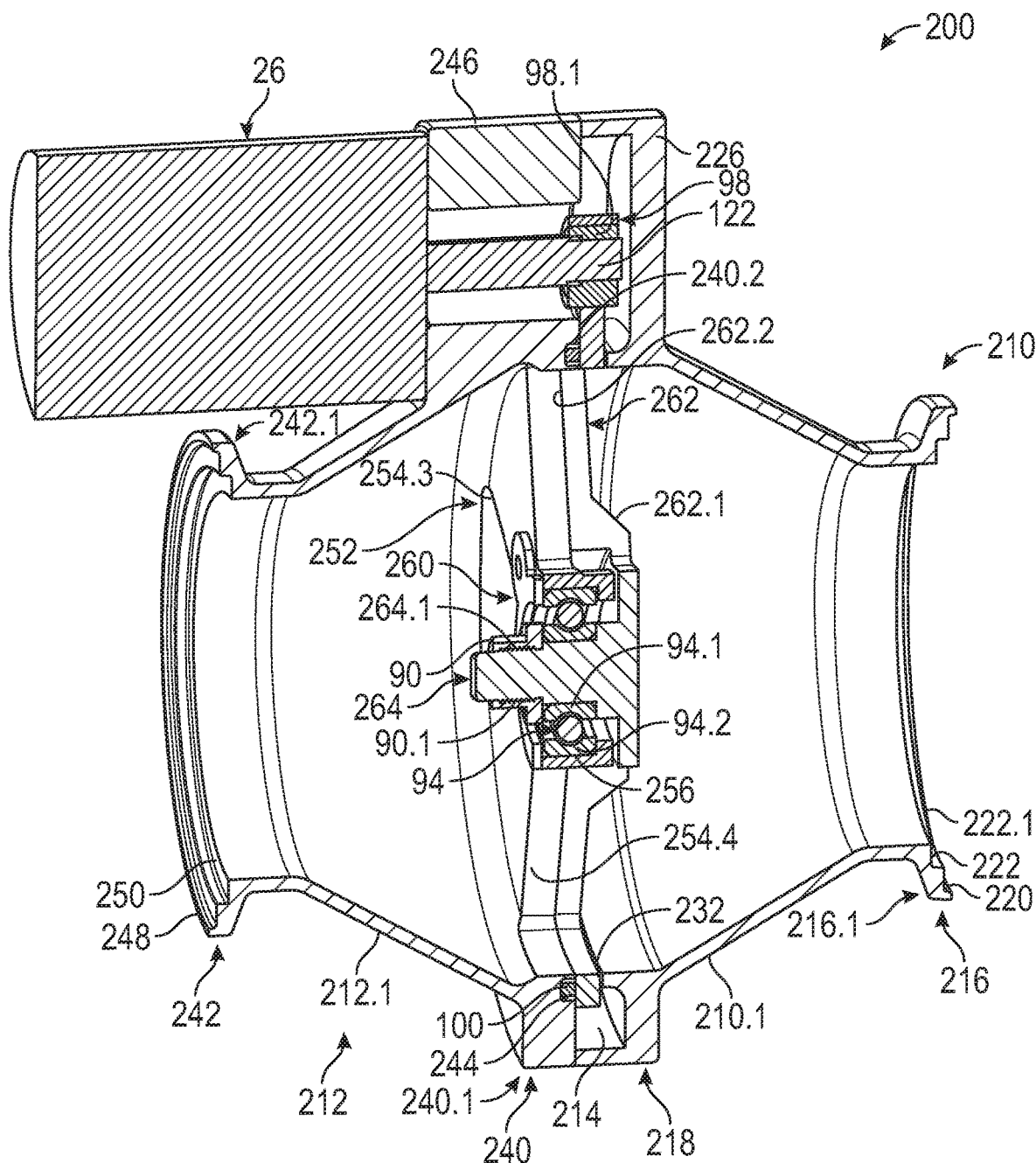
FIG. 10 is a cross-sectional view of the rotary plate valve system of FIG. 9, taken along line 10-10 of FIG. 9.

The rotary plate valve 204 includes a first valve body 210, a second valve body 212 and a plate assembly 214. The first valve body 210 includes a first end 216 and an opposite second end 218. The first end 216 is coupled to the bleed supply inlet duct 14 (FIG. 1) and the second end 218 is coupled to the second valve body 212. With reference to FIG. 10, the first end 216 includes a first flange 216.1 that is annular and surrounds the first end 216 of the first valve body 210. The first flange 216.1 defines a first counterbore 220 and second counterbore 222 that each extend about a perimeter or circumference of the first flange 216.1. The first counterbore 220 and the second counterbore 222 are defined through the first flange 216.1 and cooperate to enable a portion of the bleed supply inlet duct 14 (FIG. 1) to be received within and fluidly coupled to the first valve body 210. It should be noted that the use of the first counterbore 220 and the second counterbore 222 for coupling the bleed supply inlet duct 14 (FIG. 1) to the rotary plate valve 204 is merely exemplary, as the first end 216 may include a plurality of threads, one or more flanges, etc.

The second end 218 defines a second annular flange 218.1. The second annular flange 218.1 defines a third counterbore 224 that extends about a perimeter or circumference of the second annular flange 218.1. The third counterbore 224 defines a recess within the second end 218 for receiving a portion of the plate assembly 214. The second annular flange 218.1 may be asymmetrical to define a gear housing portion 226. The gear housing portion 226 extends outwardly from the exterior surface 210.1 of the first valve body 210. The gear housing portion 226 receives a portion of the plate assembly 214 to couple the plate assembly 214 to the actuator 26.

The first valve body 210 also defines a fluid channel 230 within the first valve body 210 from the first end 216 to the second end 218. In this example, the first valve body 210 includes a single fluid channel 230. The fluid channel 230 includes an inlet 222.1 defined by the second counterbore 222 and a first outlet 232. As will be discussed, the first outlet 232 is selectively in fluid communication with the second valve body 212 based on a position of the plate assembly 214.

The second valve body 212 includes a third end 240 and an opposite fourth end 242. The third end 240 is coupled to the first valve body 210 and the fourth end 242 is coupled to the outlet duct 22 (FIG. 1). The third end 240 defines a third annular flange 240.1. The third annular flange 240.1 defines a bearing groove 244 that extends about a perimeter or circumference of the third annular flange 240.1. The bearing groove 244 is defined within a surface 240.2 of the third annular flange 240.1, and receives a portion of the plate assembly 214. The third end 240 may also define a second actuator housing portion 246. The second actuator housing portion 246 is substantially cylindrical, and extends outwardly from an exterior surface 212.1 of the second valve body 212. The second actuator housing portion 246 is hollow for receiving a portion of the actuator 26 to couple the actuator 26 to the rotary plate valve 204. In one example, with reference to FIG. 9, the second actuator housing portion 246 includes a pair of flanges 247, which each define a throughbore 247.1. The flanges 247 receive a mechanical fastener therethrough, such as a bolt, screw, etc. and cooperate with the mating flanges 124 of the actuator 26 to couple the actuator 26 to the rotary plate valve 24.

The fourth end 242 includes a fourth flange 242.1 that is annular and surrounds the fourth end 242 of the second valve body 212. The fourth flange 242.1 defines a fourth counterbore 248 and a fifth counterbore 250 that each extend about a perimeter or circumference of the fourth flange 242.1. The fourth counterbore 248 and the fifth counterbore 250 are defined through the fourth flange 242.1 and cooperate to enable a portion of the outlet duct 22 (FIG. 1) to be received within and fluidly coupled to the fourth flange 242.1. It should be noted that the use of the fourth counterbore 248 and the fifth counterbore 250 for coupling the outlet duct 22 (FIG. 1) to the rotary plate valve 204 is merely exemplary, as the fourth end 242 may include a plurality of threads, one or more flanges, etc. In this example, the fifth counterbore 250 defines a common second outlet 250.1 for the second valve body 212. The exterior surface 212.1 of the second valve body 212 is substantially smooth, and in one example, the exterior surface 32.1 tapers from the third end 240 toward the fourth end 242. An interior surface 212.2 is opposite the exterior surface 212.1.

The second valve body 212 also defines an inlet flange 252 that extends radially inward at the third end 240. In one example, the inlet flange 252 defines a plurality of second inlets 254 that are spaced apart about a perimeter or circumference of the inlet flange 252. In one example, the inlet flange 252 defines four second inlets 254.1-254.4. As will be discussed, each of the second inlets 254.1-254.4 are selectively in fluid communication with the first valve body 210 based on a position of the plate assembly 214. The inlet flange 252 also defines a central opening 256. The central opening 256 receives a portion of the plate assembly 214 to couple the plate assembly 214 to the second valve body 212.

As the first valve body 210 and the second valve body 212 may be formed using the same technique as the first valve body 30 and the second valve body 32 as discussed with regard to FIGS. 1-8D, the formation of the first valve body 210 and the second valve body 212 will not be discussed in detail herein. Briefly, in one example, the first valve body 210 and the second valve body 212 are composed of a metal or metal alloy. Generally, the first valve body 210 and the second valve body 212 are composed of aluminum alloys or steel alloys depending upon the operating environment of the rotary plate valve 204. The first valve body 210 and the second valve body 212 may be formed using investment casting, fugitive core casting, and using other additive manufacturing processes, including, but not limited to, direct metal laser sintering.

With continued reference to FIG. 10, the plate assembly 214 includes the coupling member 90, a coupling flange 260, the bearing 94, a plate 262, the gear 98 and the second bearing ring 100. It should be noted that while the plate assembly 214 is described and illustrated herein as including the bearing 94 and the second bearing ring 100, the plate assembly 214 may include one or more bushing rings, bushings, or other devices that enable rotation of the plate 262 relative to the first valve body 210 and the second valve body 212.

The coupling member 90 couples and retains the plate assembly 214 on the first valve body 210. In one example, the plurality of threads 90.1 of the coupling member 90 matingly engage with a plurality of threads 264.1 of a shaft 264 of the plate 262 (FIG. 3). The coupling member 90 retains the bearing 94 and the plate 96 on the shaft 264 of the first valve body 210. The coupling flange 260 is coupled to the inlet flange 252 and further retains the bearing 94 within the central opening 256 of the inlet flange 252. In one example, the coupling flange 260 may be coupled to the inlet flange 252 via one or more mechanical fasteners, such as screws. The bearing 94 is received within a groove 264.2 of the shaft 264 and is coupled to the plate 262. In one example, the inner race 94.1 is coupled to the groove 264.2 on the shaft 264 and the outer race 94.2 is coupled to the central opening 256 of the inlet flange 252. It should be noted that the bearing 94 may also comprise a roller bearing, if desired.

Figure 11:
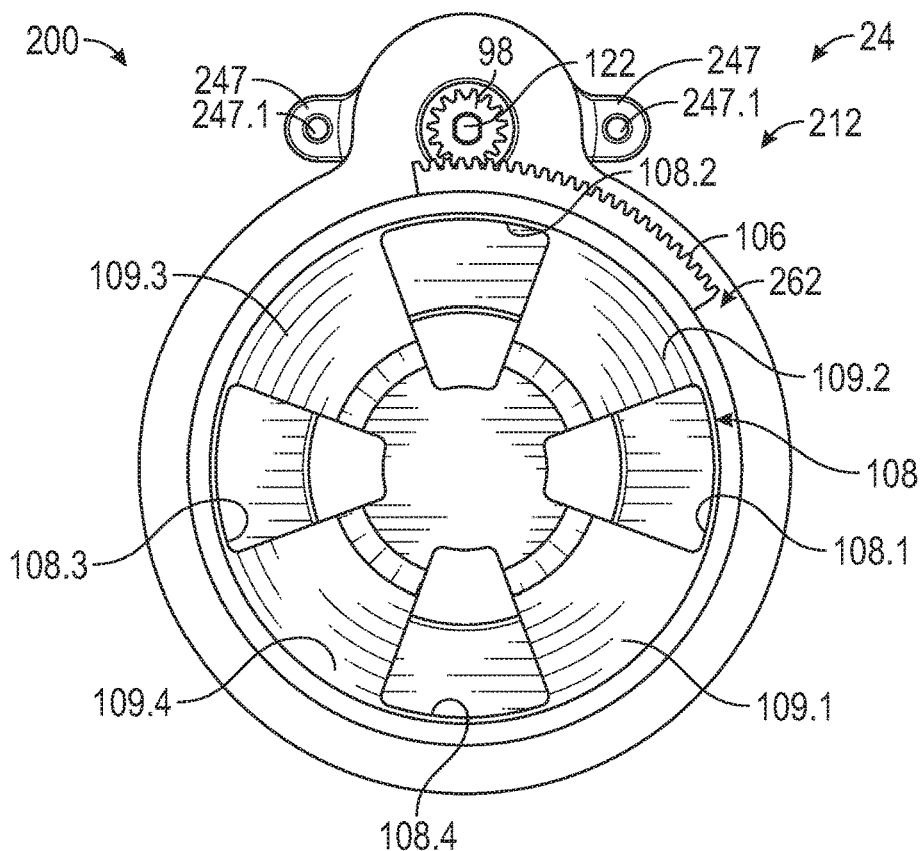
FIG. 11 is a perspective view of a portion of a plate assembly of the rotary plate valve of the rotary plate valve system of FIG. 9.

The plate 262 is circular, and includes the first side 262.1 and an opposite second side 262.2. The first side 262.1 faces the second end 218 of the first valve body 210. The second side 262.2 faces the inlet flange 252 of the second valve body 212. With reference to FIG. 11, the plate 262 also defines the plurality of plate gear teeth 106, the plurality of openings 108 and the shaft 264 (FIG. 10). The plurality of plate gear teeth 106 are defined along the perimeter or circumference of the plate 262. The plurality of plate gear teeth 106 meshingly engage with the plurality of gear teeth 98.1 of the gear 98 to enable the plate 262 to be driven or rotated by the actuator 26.

The plurality of openings 108 are defined through the plate 262 from the first side 262.1 to the second side 262.2. The plurality of openings 108 are spaced apart about the perimeter or circumference of the plate 96. Generally, each of the plurality of openings 108 corresponds to one of the second inlets 254.1-254.4. Thus, in this example, the plate 262 includes the four openings 108.1-108.4, which each have the same flowpath area as the second inlets 254.1-254.4. The openings 108.1-108.4 are sized such that the section 109.1-109.4 of the plate 96 between adjacent ones of the openings 108.1-108.4 is the same size as the adjacent opening 108.1-108.4. This provides for the second, closed position of the rotary plate valve 204. Stated another way, the sections 109.1-109.4 are sized to completely obstruct the flow of fluid into the second inlets 254.1-254.4, thereby providing the second, closed position of the rotary plate valve 204. When the openings 108.1-108.4 are fully or completely aligned with the second inlets 254.1-254.4, the rotary plate valve 204 is in the first, open position such that fluid flows from the first valve body 210 into and through the second inlets 254.1-254.4.

With reference to FIG. 10, the shaft 264 extends axially from the second side 262.2 of the plate 262 into the second valve body 212. The shaft 264 is coupled to the bearing 94 such that the shaft 264 rotatably couples the plate 262 to the second valve body 212. The plate 262 is composed of a metal or metal alloy, and may be cast, forged, stamped or formed with additive manufacturing, including, but not limited to, direct metal laser sintering.

The gear 98 is coupled to the actuator 26 and is driven by the actuator 26 to move or drive the plate 262. The gear 98 is retained within the gear housing portion 226. The second bearing ring 100 facilitates the rotation of the plate 262 relative to the second valve body 212. The plurality of ball bearings 92.1 of the second bearing ring 100 are positioned within the bearing groove 244 defined in the third end 240 of the second valve body 212.

The actuator 26 is in communication with the controller 28 (FIG. 1) to receive one or more control signals to drive the gear 98, and thus, the plate 262 between the first, open position, the second, closed position and positions in-between. The actuator 26 includes the motor 120 and the output shaft 122.

In one example, in order to assemble the rotary plate valve system 200, with the second valve body 212 formed and the second bearing ring 100 formed and assembled, the second bearing ring 100 is positioned within the bearing groove 244 of the second valve body 212. The bearing 94 is positioned within the central opening 256, and the coupling flange 260 is fastened to the second valve body 212 to secure the bearing 94 to the second valve body 212. With the plate 262 formed, the shaft 264 is positioned through the bearing 94 such that the shaft 264 is coupled to the inner race 94.1 for rotation. The coupling member 90 is coupled to the shaft 264 to couple the plate 262 to the second valve body 212. With the gear 98 formed, the gear 98 is positioned within the gear housing portion 226 of the first valve body 210 such that the plurality of gear teeth 98.1 mesh with the plurality of plate gear teeth 106 of the plate 96. The output shaft 122 is inserted through the second actuator housing portion 246 of the second valve body 32 and is fixedly coupled to the gear 98, via a press-fit, for example. With the throughbores 126 of the mating flanges 124 coaxially aligned with the throughbores 69.1 of the flanges 69 (FIG. 9) of the second actuator housing portion 246 of the second valve body 212, the mechanical fasteners are inserted to couple the actuator 26 to the rotary plate valve 204.

With the rotary plate valve system 200 assembled, in the example of FIG. 1, the bleed supply inlet duct 14 is coupled to the first end 216 of the first valve body 210, and the outlet duct 22 is coupled to the fourth end 242 of the second valve body 212. The actuator 26 is placed in communication with the controller 28 via a communication architecture that enables the transfer of commands, power, data, etc., such as a bus. As the control of the rotary plate valve 204 is the same as the control of the rotary plate valve 24, the control of the rotary plate valve 204 will not be discussed in detail herein. Briefly, based on the receipt of one or more control signals from the controller 28, the motor 120 drives the output shaft 122 to rotate the gear 98 in a clockwise direction to move the plate 262 and thus, the rotary plate valve 24 toward the first, open position. As the plate 262 moves relative to the second valve body 212, the sections 109.1-109.4 obscure less of the second inlets 254.1-254.4 as the rotary plate valve 24 approaches the 100% open or first, open position. In addition, based on the receipt of one or more control signals from the controller 28, the motor 120 drives the output shaft 122 to rotate the gear 98 in a counterclockwise direction to move the plate 96 and thus, the rotary plate valve 24 toward the second, closed position. In the second, closed position, each of the second inlets 254.1-254.4 is completely obstructed by the sections 109.1-109.4 and the rotary plate valve 204 is 0% open. In the second, closed position, the rotary plate valve 204 provides substantially zero fluid flow from the bleed supply inlet duct 14 to the outlet duct 22.

Thus, the rotary plate valve system 10 enables the control of fluid flow through the outlet duct 22 with the plate 262, which is rotatable by the actuator 26 to vary a supply of fluid into the outlet duct 22. The rotation of the plate 262 to adjust the rotary plate valve 24 between the first, open position, the second, closed position and positions in-between enables the use of a smaller actuator 26, thereby reducing a weight and a cost of the rotary plate valve system 10.

It will be understood that the rotary plate valve system 10 described with regard to FIGS. 1-8D may be configured differently to provide control of the fluid flow into the outlet duct 22. In one example, with reference to FIG. 12, a rotary plate valve system 300 is shown. As the rotary plate valve system 300 includes components that are substantially similar to or the same as the rotary plate valve system 10 discussed with regard to FIGS. 1-8D, the same reference numerals will be used to denote the same or similar features. Similar to the rotary plate valve system 10 of FIG. 1, the rotary plate valve system 300 is coupled to and in fluid communication with the bleed supply inlet duct 14 (FIG. 1)

to receive bleed fluid, such as bleed air. The bleed air is selectively provided by the rotary plate valve system 300 to other components or systems associated with the aircraft 20, such as the gas turbine engine 8 (FIG. 1), via at least one outlet duct 302. The rotary plate valve system 300 is also coupled to the bleed supply inlet duct 14 and the at least one outlet duct 302 to enable surge fluid generated by the gas turbine engine 8 (FIG. 1) to pass through the rotary plate valve 304 and be exhausted through the APU 18 (FIG. 1). The rotary plate valve system 300 includes a rotary plate valve 304 and the actuator 26. As discussed with regard to FIGS. 1-8D, the actuator 26 is responsive to one or more control signals from the controller 28 (FIG. 1) to move the rotary plate valve 304 to a first, open bleed position (in which fluid flows through the at least one outlet duct 302), a second, closed position (in which bleed air does not flow through the at least one outlet duct 302) and various bleed positions in between the first, open position and the second, closed position. The actuator 26 is also responsive to one or more control signals from the controller 28 associated with the APU 18 or the aircraft 20 (FIG. 1) to move the rotary plate valve 304 from the second, closed position to a first, open surge position to exhaust additional flow generated by the gas turbine engine 8 (received from the at least one outlet duct 302) through the APU 18.

Figure 12:
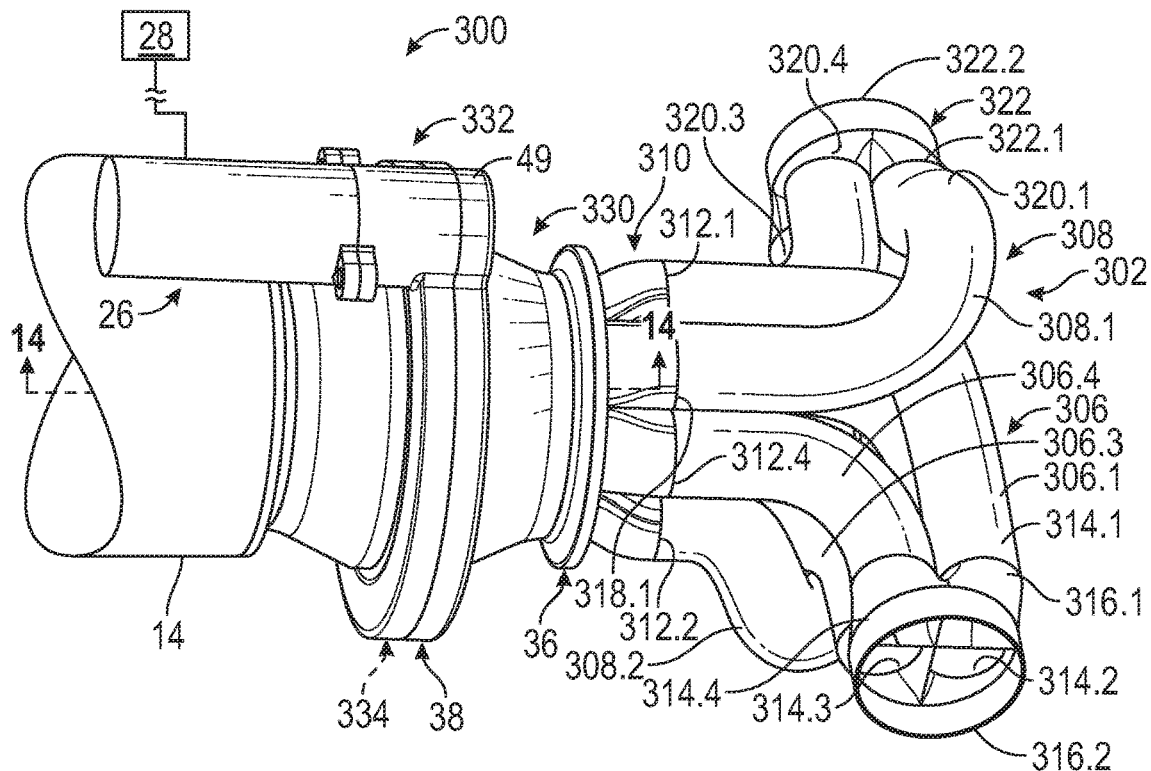
FIG. 12 is a perspective view of another exemplary rotary plate valve system having a rotary plate valve and the actuator for use with the aircraft of FIG. 1.

With reference to FIG. 12, the at least one outlet duct 302 includes a plurality of load outlet ducts 306 and a plurality of surge ducts 308. Each of the plurality of load outlet ducts 306 and the plurality of surge ducts 308 are coupled to the rotary plate valve 304 via an outlet flange 310. In this example, the plurality of load outlet ducts 306 include four load outlet ducts 306.1-306.4, which each have a respective load inlet 312.1-312.4 coupled to and in fluid communication with the outlet flange 310 and a respective load outlet 314.1-314.4 coupled to and in fluid communication with a downstream consumer via a load outlet flange 316. The load outlet flange 316 defines a common load outlet, and can be coupled to or in fluid communication with a downstream consumer, such as the gas turbine engine 8 (FIG. 1). The load outlet flange 316 includes a first end 316.1 having a plurality of flow inlets, and a second end 316.2 that defines the common load outlet. The plurality of surge ducts 308 include four surge ducts 308.1-308.4, which each have a respective surge outlet 318.1-318.4 coupled to and in fluid communication with the outlet flange 310 and a respective surge inlet 320.1-320.4 coupled to and in fluid communication with the gas turbine engine 8 (FIG. 1) via a surge inlet flange 322. The surge inlet flange 322 defines a common surge inlet, and can be coupled to or in fluid communication with the gas turbine engine 8 to enable surge fluid flow from the gas turbine engine 8 to flow through the rotary plate valve 304 and be exhausted through the APU 18 (FIG. 1). The surge inlet flange 322 includes a first end 322.1 having a plurality of flow outlets, and a second end 322.2 that defines the common surge inlet.

Figure 13:
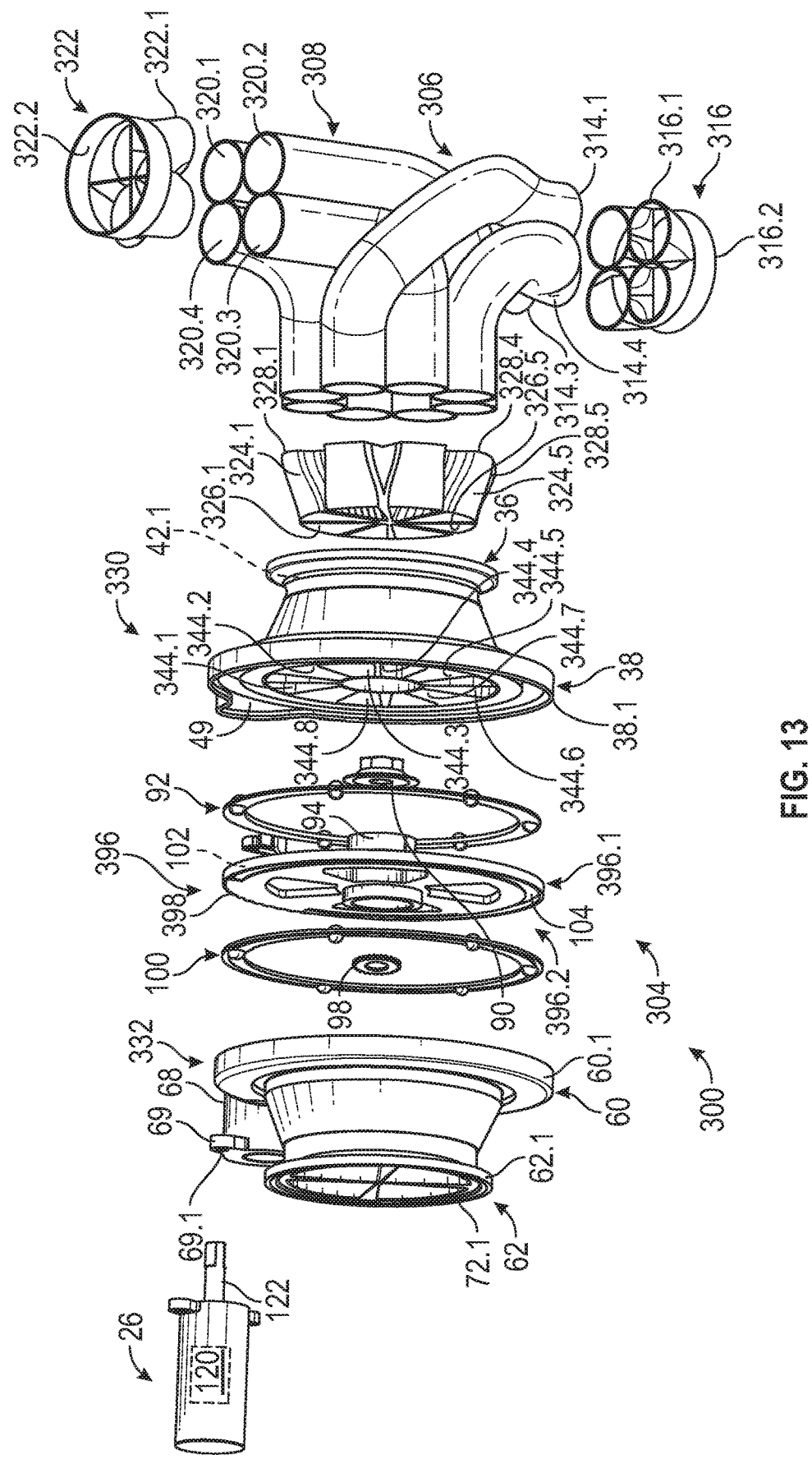
FIG. 13 is an expanded view of the rotary plate valve system of FIG. 12.

With reference to FIG. 13, the outlet flange 310 is shown in greater detail. In this example, the outlet flange 310 includes a plurality of flow channels 324 defined within the outlet flange 310 about a circumference of the outlet flange 310. In this example, the outlet flange 310 includes eight flow channels 324.1-324.8, which are separated or defined by inner walls of the outlet flange 310. Each of the flow channels 324.1-324.8 has a respective inlet 326.1-326.8 at a first end of the outlet flange 310, which is in fluid communication with the first common inlet 42.1 of the rotary plate valve 304. The flow channels 324.1-324.8 separate downstream from the inlets 326.1-326.8 such that respective outlets 328.1-328.8 are spaced apart from each other about the outlet flange 310 to facilitate coupling the plurality of load outlet ducts 306 and the plurality of surge ducts 308 to the respective outlets 328.1-328.8. The outlets 328.1-328.8 are coupled to the respective ones of the load outlet ducts 306 and the surge ducts 308 so as to be in selective fluid communication with the respective one of the load outlet ducts 306 and the surge ducts 308 based on a position of the rotary plate valve 304.

Figure 14:
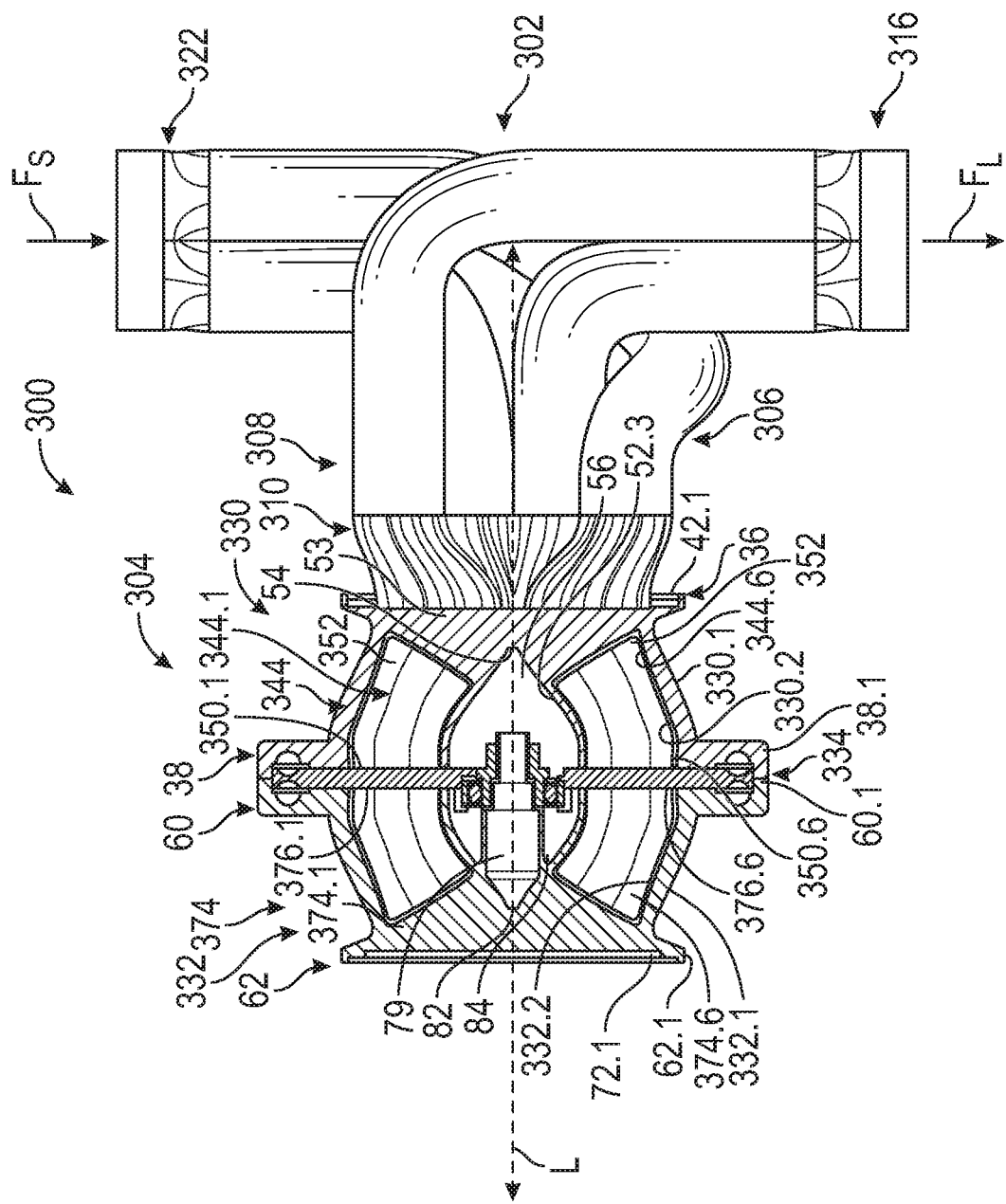
FIG. 14 is a cross-sectional view of the rotary plate valve system of FIG. 12, taken along line 14-14 of FIG. 12.

With reference to FIG. 12, the rotary plate valve 304 includes a first valve body 330, a second valve body 332 and a plate assembly 334. The first valve body 330 includes the first end 36 and the opposite second end 38. In this example, the first end 36 is coupled to the outlet flange 310 and the second end 38 is coupled to the second valve body 32. With reference to FIG. 14, the first end 36 includes the first flange 36.1 that enables a portion of the outlet flange 310 to be received within and fluidly coupled to the first valve body 330. The first end 36 also defines the common first inlet 42.1 for each of a first plurality of fluid channels 344 defined in the first valve body 330 from the first end 36 to the second end 38. The first valve body 330 has an interior surface 330.2 that is opposite an exterior surface 330.1. The second end 38 defines the second annular flange 38.1 and the gear housing portion 49 (FIG. 12).

With reference to FIG. 13, the first plurality of fluid channels 344 is defined within the first valve body 330 from the first end 36 to the second end 38. In this example, the first valve body 330 includes eight first fluid channels 344.1-344.8. Each of the first fluid channels 344.1-344.8 are spaced apart about a perimeter or circumference of the first valve body 330. Each of the first fluid channels 344.1-344.8 includes the common first inlet 42.1 and a respective first outlet 350.1-350.8 (FIG. 14). As will be discussed, each of the first outlets 350.1-350.8 are selectively in fluid communication with the second valve body 32 based on a position of the plate assembly 334.

Figure 13A:
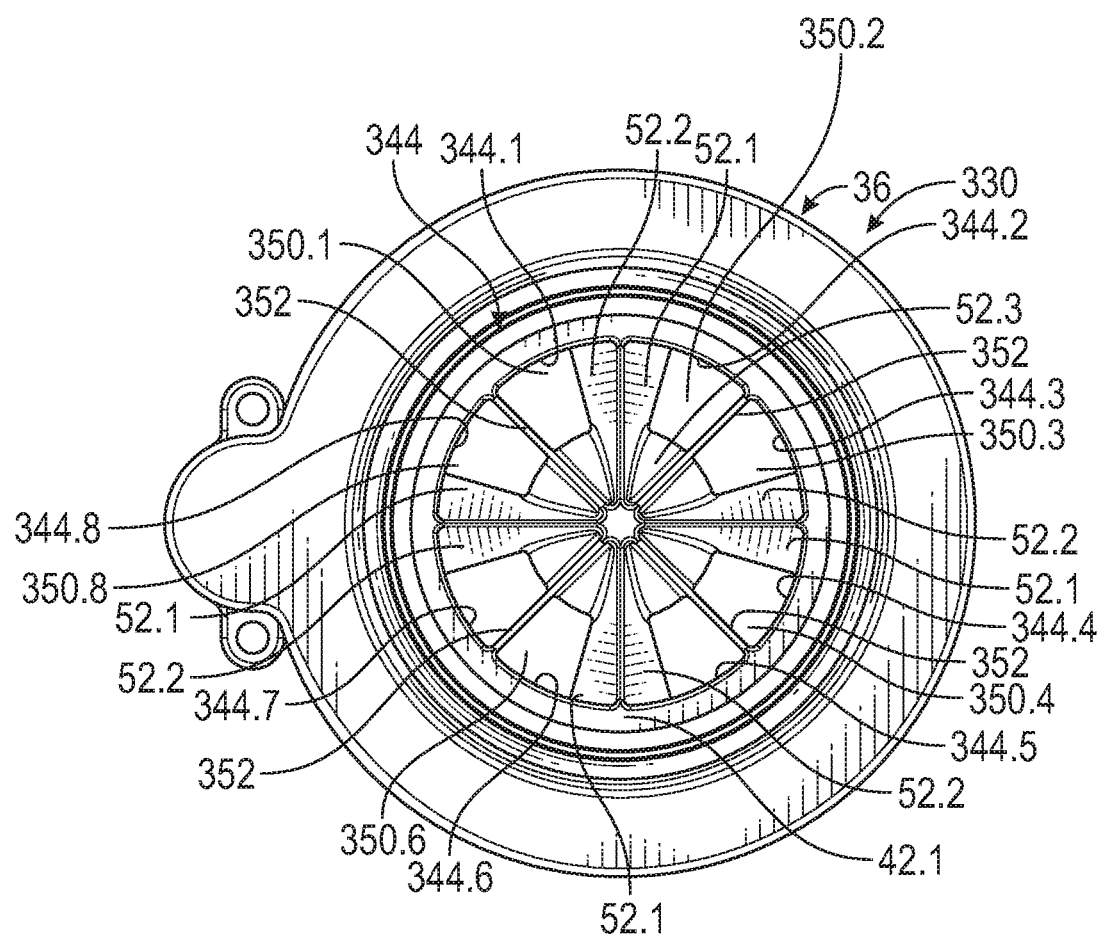
FIG. 13A is an end view of a first valve body of the rotary plate valve of the rotary plate valve system of FIG. 12.

With reference to FIG. 13A, each pair of the first fluid channels 344.1-344.8 (344.2, 344.3; 344.4, 344.5; 344.6, 344.7; 344.8, 344.1) generally corresponds to one of the first fluid channels 44.1-44.4 of the first valve body 30 of FIGS. 1-8D. In this regard, each pair of the first fluid channels 344.1-344.8 is defined by one of the sidewalls 52.1, 52.2, the conical flange 52.3, a divider 352 and the interior surface 330.2. The sidewalls 52.1, 52.2 of adjacent pairs of the first fluid channels 44.1-44.4 are interconnected via the rib 52.4. Generally, the sidewalls 52.1, 52.2 cooperate to form a substantially triangular shape that extends from the first end 36 to the conical flange 52.3, and the divider 352 is positioned between the sidewalls 52.1, 52.2 to separate the respective pair of fluid channels (344.2, 344.3; 344.4, 344.5; 344.6, 344.7; 344.8, 344.1) into two separate flow channels. In one example, the sidewalls 52.1, 52.2 and the divider 352 are coupled to the conical flange 52.3 downstream from the common first inlet 42.1. In this example, with reference to FIG. 14, the sidewalls 52.1, 52.2 and the divider 352 form the common wall 53 that extends along a length of the first valve body 330 from the common first inlet 42.1 to the divergence point 54 defined at the conical flange 52.3. Generally, the divergence point 54 may be located between the common first inlet 42.1 and any location downstream of common first inlet 42.1 within the first valve body 330 based on the specific installation environment of the rotary plate valve 304. By diverging at the divergence point 54 defined by the conical flange 52.3, the first fluid channels 344.1-344.8 also enable a portion of the plate assembly 334 to be received within the second end 38 of the first valve body 330. In this regard, the conical flange 52.3 defines the first cavity 56 within the second end 38 of the first valve body 330.

The first fluid channels 344.1-344.8 diverge outwardly or away from a longitudinal axis L defined through the rotary plate valve 304. Each of the first fluid channels 344.1-344.8 are bounded by one of the sidewalls 52.1, 52.2, the divider 352 and the interior surface 30.2 such that, in the example of the rotary plate valve 304 as a surge valve, downstream from the common inlet 42.1, each of the first fluid channels 344.1-344.8 is fluidly isolated from or separate from a remainder of the first fluid channels 344.1-344.8. Stated another way, in the example of the rotary plate valve 304 as a surge valve with surge fluid flowing in the direction of Fs, the first fluid channels 344.1-344.8 define discrete fluid channels downstream from the common inlet 42.1 such that fluid downstream from the common inlet 42.1 does not mix between the first fluid flow channels 344.1-344.8. In this example, the first outlets 350.1-350.8 are defined at the second end 38 of the first valve body 330. Generally, each of the first outlets 350.1-350.8 is discrete, such that fluid flowing through the respective first fluid channels 344.1-344.8 enters or exits the respective first fluid channel 344.1-344.8 at the respective first outlet 350.1-350.8. Each of the first outlets 350.1-350.8 is selectively in fluid communication with respective ones of a second plurality of fluid channels 374 defined in the second valve body 332 based on a position of the plate assembly 334.

The second valve body 332 includes the third end 60 and the opposite fourth end 62. The third end 60 is coupled to the first valve body 330 and the fourth end 62 is coupled to the bleed supply inlet duct 14 (FIG. 1). With reference to FIG. 13, the third end 60 defines the third annular flange 60.1 and the second actuator housing portion 68. The fourth end 62 includes the fourth flange 62.1 that cooperates to enable a portion of the bleed supply inlet duct 14 (FIG. 1) to be received within and fluidly coupled to the fourth flange 62.1. In this example, with reference to FIG. 14, the fourth flange 62.1 defines the common second outlet 72.1 for each of a second plurality of fluid channels 374 defined in the second valve body 332 from the third end 60 to the fourth end 62. The second valve body 332 has an interior surface 332.2 that is opposite an exterior surface 332.1.

Figure 15:
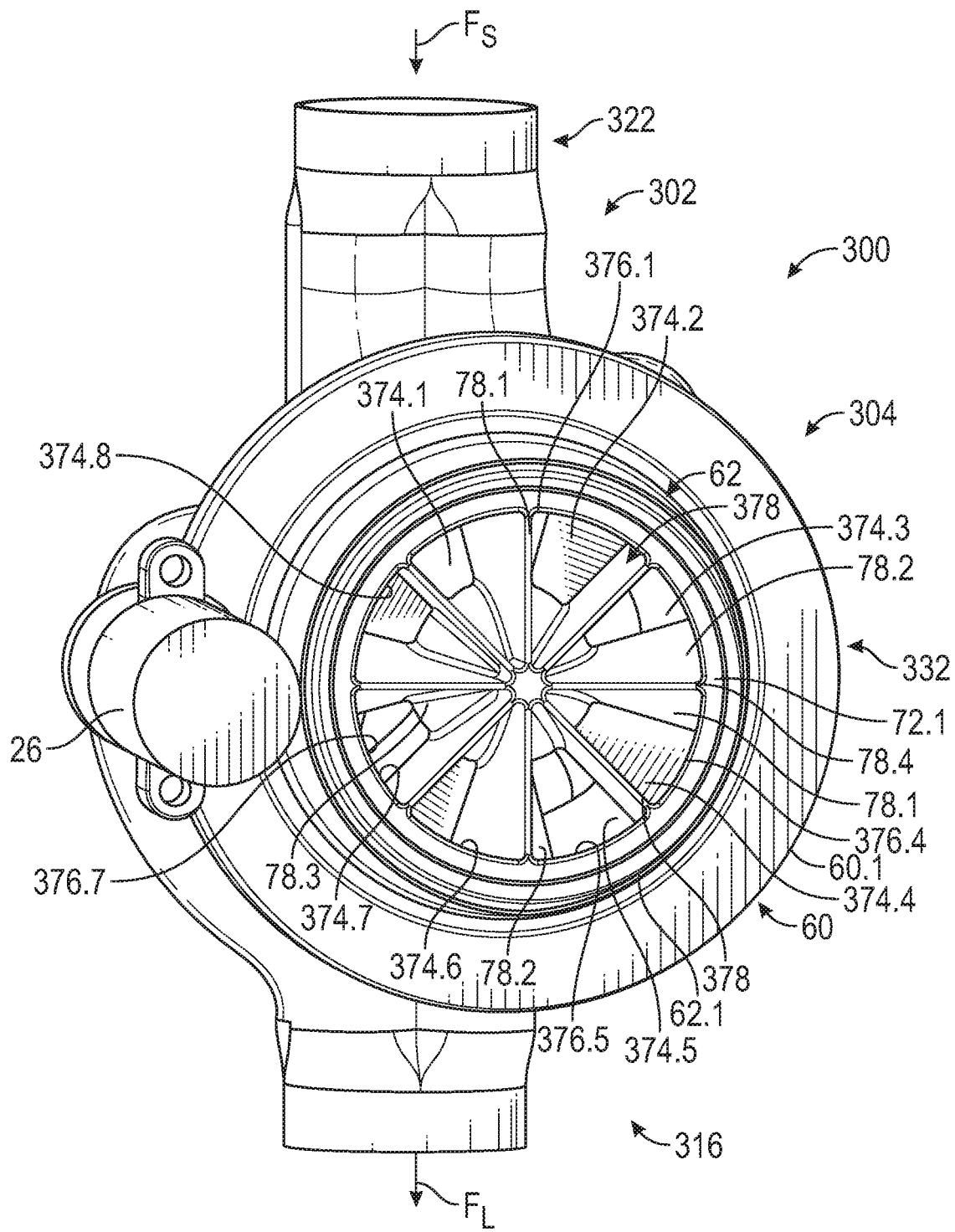
FIG. 15 is an end view of the rotary plate valve system of FIG. 12.

The second plurality of fluid channels 374 is defined within the second valve body 332 from the third end 60 to the fourth end 62. In this example, with reference to FIG. 15, the second valve body 332 includes eight second fluid channels 374.1-374.8, which each correspond to one of the first fluid channels 344.1-344.8. Each of the second fluid channels 374.1-374.8 are spaced apart about a perimeter or circumference of the second valve body 332. In the example of the rotary plate valve 304 as a surge valve with surge fluid flowing in the direction of Fs, each of the second fluid channels 374.1-374.8 includes a respective second inlet 376.1-376.8 and the common second outlet 72.1. As will be discussed, each of the second inlets 376.1-376.8 are selectively in fluid communication with the first valve body 330 based on a position of the plate assembly 334. In this regard, a sub-plurality of the second fluid channels (376.1, 376.3, 376.5, 376.7) are in selective fluid communication with a sub-plurality of the first fluid channels (344.1, 344.3, 344.5, 344.7) based on a position of the plate assembly 334, and a sub-plurality of the second fluid channels (376.2, 376.4, 376.6, 376.8) are in selective fluid communication with a sub-plurality of the first fluid channels (344.2, 344.4, 344.6, 344.8) based on a position of the plate assembly 334.

Each pair of the second fluid channels 374.1-374.8 (374.2, 374.3; 374.4, 374.5; 374.6, 374.7; 374.8, 374.1) generally corresponds to one of the second fluid channels 74.1-74.4 of the second valve body 32 of FIGS. 1-8D. In this regard, each of the second fluid channels 374.1-374.8 is defined by one of the pair of sidewalls 78.1, 78.2, the second conical flange 78.3, a divider 378 and the interior surface 332.2. The sidewalls 78.1, 78.2 of adjacent ones of the second fluid channels 374.1-374.8 are interconnected via the rib 78.4. Generally, the sidewalls 78.1, 78.2 and the divider 378 cooperate to form a substantially triangular shape that extends from the second conical flange 78.3 to the fourth end 62. In one example, the sidewalls 78.1, 78.2 and the divider 378 are coupled to the second conical flange 78.3 at the third end 60 to define the second inlets 376.1-376.8. In this example, with reference to FIG. 14, the second conical flange 78.3 includes the shaft 79 defined internally within the second valve body 332. The shaft 79 receives and is coupled to a portion of the plate assembly 334.

In the example of the rotary plate valve 304 as a surge valve with surge fluid flowing in the direction of Fs, the sidewalls 78.1, 78.2 downstream from the second conical flange 78.3 form the second common wall 80 that extends along a length from the convergence point 82 defined at the second conical flange 78.3 to the common second outlet 72.1. The convergence point 82 is selected to provide reduced fluid and pressure losses as the fluid flows through the second valve body 332. Generally, the convergence point 82 may be located between the common second outlet 72.1 and any location upstream of common second outlet 72.1 within the second valve body 332 based on the specific installation environment of the rotary plate valve 304. By diverging prior to the convergence point 82, the second fluid channels 374.1-374.8 also enable a portion of the plate assembly 334 to be received within the third end 60 of the second valve body 332. In this regard, the second conical flange 78.3 defines the second cavity 84 that cooperates with the first cavity 56 of the first valve body 330 to receive a portion of the plate assembly 334.

Generally, the second fluid channels 374.1-374.8 diverge outwardly or away from the longitudinal axis L defined through the rotary plate valve 304 prior to converging at the convergence point 82. Each of the second fluid channels 74.1-74.4 are bounded by one of the sidewalls 78.1, 78.2, the divider 378 and the interior surface 332.2 such that, in the example of the rotary plate valve 304 as a surge valve with surge fluid flowing in the direction of Fs, upstream from the common second outlet 72.1, each of the second fluid channels 374.1-374.8 is fluidly isolated from or separate from a remainder of the second fluid channels 374.1-374.8. Stated another way, with surge fluid flowing in the direction of Fs, the second fluid channels 374.1-374.8 define discrete fluid channels upstream from the common second outlet 72.1 such that fluid upstream from the common second outlet 72.1 does not mix between the second fluid channels 374.1-374.8. In this example, the second inlet 376.1-376.8 is defined at the third end 60 of the second valve body 32. Generally, each of the second inlets 376.1-376.8 is discrete, such that fluid flowing through the respective second fluid channels 374.1-374.8 enters or exits the respective second fluid channel 374.1-374.8 at the respective second inlet 376.1-376.8. Each of the second inlets 376.1-376.8 is selectively in fluid communication with respective ones of the first outlets 350.1-350.8 defined in the first valve body 330 such that fluid from a respective one of the first fluid channels 344.1-344.8 flows into a respective one of the second fluid channels 374.1-374.8 based on a position of the plate assembly 334.

In one example, each of the first fluid channels 344.1-344.8 and the second fluid channels 374.1-374.8 have the same flowpath area. By providing the first fluid channels 344.1-344.8 and the second fluid channels 374.1-374.8 with the same flowpath area, flow and pressure losses are reduced as the fluid flows from the first fluid channels 344.1-344.8 into the second fluid channels 374.1-374.8. In addition, each of the sidewalls 52.1, 52.2; 78.1, 78.2 and the dividers 352, 378 include fillets along the interconnection of the respective sidewalls 52.1, 52.2; 78.1, 78.2 and dividers 352, 378, which reduces flow separation through each of the first fluid channels 344.1-344.8 and the second fluid channels 374.1-374.8. In addition, each leading edge of the sidewalls 52.1, 52.2 and the dividers 352 has a radius to provide for a smooth transition into the respective first fluid channel 344.1-344.8 from the common first inlet 42.1 to reduce flow losses. Further, each leading edge of the sidewalls 78.1, 78.2 and the dividers 378 has a radius to provide for a smooth transition into the respective second fluid channel 374.1-374.8 from the plate 96, thereby reducing flow losses.

In one example, each of the first fluid channels 344.1-344.8 and the second fluid channels 374.1-374.8 is integrally formed, monolithic or one-piece with the first valve body 330 and the second valve body 332, respectively. In this example, the first valve body 330 and the second valve body 332 are composed of and formed in the same manner as the first valve body 30 and the second valve body 32 as discussed with regard to FIGS. 1-8D, and thus, the composition and the method of manufacturing the first valve body 330 and the second valve body 332 will not be discussed in detail herein. Briefly, however, the first valve body 330 and the second valve body 332 are composed of a metal or metal alloy, and are formed using additive manufacturing.

With reference to FIG. 13, the plate assembly 334 is shown expanded from the first valve body 330 and the second valve body 332. In one example, the plate assembly 334 includes the coupling member 90, the first bearing ring 92, the bearing 94, a plate 396, the gear 98 and the second bearing ring 100. It should be noted that while plate assembly 334 is described and illustrated herein as including the first bearing ring 92, the bearing 94 and the second bearing ring 100, the plate assembly 334 may include one or more bushing rings, bushings, or other devices that enable rotation of the plate 396 relative to the first valve body 330 and the second valve body 332.

Figure 16:
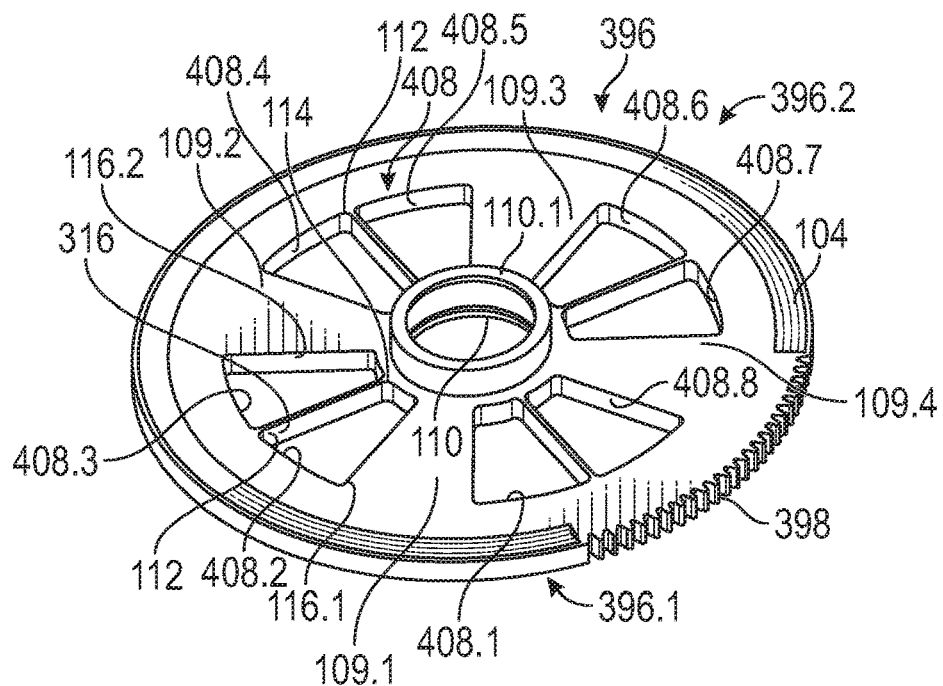
FIG. 16 is a perspective view of a plate for use with the rotary valve system of FIG. 12.

The coupling member 90 couples and retains the plate assembly 334 on the second valve body 332. The first bearing ring 92 facilitates the rotation of the plate 396 relative to the first valve body 330. The bearing 94 is received within the groove 79.2 of the shaft 79 and is coupled to the plate 396. The plate 396 is circular, and includes a first side 396.1 and an opposite second side 396.2. The plate 396 is coupled between the first valve body 330 and the second valve body 332. The first side 396.1 includes the first plate bearing groove 102 defined about a majority of a perimeter or circumference of the first side 396.1, and faces the second end 38 of the first valve body 330. The second side 396.2 includes the second plate bearing groove 104 defined about a majority of a perimeter or circumference of the second side 396.2, and faces the third end 60 of the second valve body 332. In this regard, with reference to FIG. 16, the plate 396 also defines a plurality of plate gear teeth 398, a plurality of openings 408 and the central opening 110. The plurality of plate gear teeth 398 are defined along the perimeter or circumference of the plate 396 and interrupt the first plate bearing groove 102 and the second plate bearing groove 104. The plurality of plate gear teeth 398 meshingly engage with the gear 98 to enable the plate 396 to be driven or rotated by the actuator 26. Generally, the plurality of plate gear teeth 398 extend along the perimeter of the plate 396 for a predetermined arc length that allows for the correct timing of the rotation of the plate 396 and allows for the predetermined rotational angle needed to open each of the second fluid channels 374.1-374.8. Generally, the arc length is predetermined based on the number of flow paths incorporated into the rotary plate valve 304. In one example, the plurality of gear teeth 398 of the plate 396 has a greater number of teeth than the plurality of gear teeth 106 of the plate 96 in order to rotate the plate 396 to open each of the second fluid channels 374.1-374.8.

The plurality of openings 408 are defined through the plate 396 from the first side 396.1 to the second side 396.2. The plurality of openings 408 are spaced apart about the perimeter or circumference of the plate 396. Generally, each of the plurality of openings 408 corresponds to one of the first fluid channels 344.1-344.8 and one of the second fluid channels 374.1-374.8. Thus, in this example, the plate 396 includes eight openings 408.1-408.8, which each have the same flowpath area as the first fluid channels 344.1-344.8 and the second fluid channels 374.1-374.8. The openings 408.1-408.8 are sized such that the section 109.1-109.4 of the plate 396 between adjacent pairs of the openings 408.1-408.8 is the same size as the pair of adjacent openings 408.1-408.8. This provides for the second, closed position of the rotary plate valve 304. Stated another way, the sections 109.1-109.4 are sized to completely obstruct the flow of fluid between the first fluid channels 344.1-344.8 and the second fluid channels 374.1-374.8, thereby providing the second, closed position of the rotary plate valve 304.

The openings 408.1-408.8 are shaped to correspond with the shape of the first outlets 350.1-350.8 and the second inlets 376.1-376.8. In one example, each of the openings 408.1-408.8 is defined by the first arc segment 112, the opposite second arc segment 114, the pair of radial segments 116.1, 116.2 and a dividing radial segment 416. The dividing radial segment separates each pair of openings 408.1-408.8.

With reference to FIG. 13, the central opening 110 includes the flange 110.1 that couples the plate 396 to the bearing 94. The plate 396 is composed of a metal or metal alloy, and may be cast, forged, stamped or formed with additive manufacturing, including, but not limited to, direct metal laser sintering. The gear 98 is coupled to the actuator 26 and is driven by the actuator 26 to move or drive the plate 396. The gear 98 includes the plurality of gear teeth 98.1 defined about the perimeter or circumference of the gear 98 that meshingly engage with the plurality of plate gear teeth 106 of the plate 396 to move or drive the plate 396. The second bearing ring 100 facilitates the rotation of the plate 396 relative to the second valve body 332.

The rotary plate valve 304 movable between the various positions with the actuator 26, which is in communication with the controller 28. Generally, the actuator 26 is in communication with the controller 28 (FIG. 12) to receive one or more control signals to drive the gear 98, and thus, the plate 396 between the first, open position, the second, closed position and positions in-between. The controller 28 includes at least one processor 130 and the computer readable storage device or media 132 (FIG. 1). The computer-readable storage device or media 132 stores data, some of which represent executable instructions, used by the controller 28 in controlling components associated with the rotary plate valve system 300. The instructions may include one or more separate programs, each of which comprises an ordered listing of executable instructions for implementing logical functions. The instructions, when executed by the processor 130, receive and process input signals, perform logic, calculations, methods and/or algorithms for controlling the components of the rotary plate valve system 300 of the aircraft 12, and generate control signals to the actuator 26 of the rotary plate valve system 300 to control a position of the plate 396 based on the logic, calculations, methods, and/or algorithms. Although only one controller 28 is shown in FIG. 12, embodiments of the aircraft 12 may include any number of controllers 28 that communicate over any suitable communication medium or a combination of communication mediums and that cooperate to process the sensor signals, perform logic, calculations, methods, and/or algorithms, and generate control signals to control features of the rotary plate valve system 300.

In various embodiments, one or more instructions of the controller 28 are associated with the rotary plate valve system 300 and, when executed by the processor 130 (FIG. 1), the instructions output one or more control signals to the actuator 26 to move the plate 396, and thus, the rotary plate valve 304 between the first, open load position, the second, closed position and positions in-between. In addition, the instructions output one or more control signals to the actuator 26 to move the plate 396, and thus, the rotary plate valve 304 between the first, open surge position and the second, closed position. In various embodiments, a rotary valve control system may include one or more control modules embedded within the controller 28 for controlling the actuator 26. The rotary valve control system may include a closed or an open loop control methodology that controls the actuator 26 to move the plate 396 to a predetermined position based on input signals received from various sensors or systems associated with the aircraft 12, or in other embodiments, the rotary valve control system may be an internal open loop control system that controls the actuator 26 based on input received to the rotary valve control system. In certain embodiments, the rotary valve control system may comprise a combination of the two. Due to the nature and capability of the rotating plate 396, the actuator 26 can be used to modulate the position of the plate 396 such that a modulated fluid flow results from the exit of the rotary plate valve 24. The actuator 26 can also be used to enable surge flow from the gas turbine engine 8 (FIG. 1) to be exhausted through the APU 18 (FIG. 1).

As the method of assembly of the rotary plate valve 304 is the same as the rotary plate valve 24 discussed with regard to FIGS. 1-8D, the assembly of the rotary plate valve 304 will not be discussed in detail herein. With the rotary plate valve 304 assembled, the output shaft 122 is inserted through the second actuator housing portion 68 of the second valve body 32 and is fixedly coupled to the gear 98, via a press-fit, for example. With the throughbores 126 of the mating flanges 124 coaxially aligned with the throughbores 69.1 of the flanges 69 of the second actuator housing portion 68 of the second valve body 332, the mechanical fasteners are inserted to couple the actuator 26 to the rotary plate valve 304.

With the rotary plate valve system 300 assembled, with reference to FIG. 12, the bleed supply inlet duct 14 is coupled to the fourth end 62 of the second valve body 332, and the outlet flange 310 is coupled to the first end 36 of the first valve body 330. The plurality of load outlet ducts 306 are coupled to the outlet flange 310 and to the load outlet flange 316. The plurality of surge ducts 308 are coupled to the outlet flange 310 and to the surge inlet flange 322. The actuator 26 is placed in communication with the controller 28 via a communication architecture that enables the transfer of commands, power, data, etc., such as a bus. Initially, the rotary plate valve system 300 is in the second, closed position, as shown in FIG. 17.

Based on the receipt of one or more control signals from the controller 28 to operate the rotary plate valve 304 as a surge valve, the motor 120 drives the output shaft 122 to rotate the gear 98 (FIG. 13) in a clockwise direction to move the plate 396 and thus, the rotary plate valve 304 toward the first, open surge position (100% open for surge flow). In one example, upon receipt of one or more control signals to move the rotary plate valve 304 to the first, open surge position, with reference to FIG. 17A, the actuator 26 rotates the gear 98 (FIG. 13) clockwise for a predetermined rotational angle that corresponds to a movement of the plate 396 that results in about a 100% blockage or obstruction of flow through the respective second inlets 376.2, 376.4, 376.6, 376.8 that are associated with the load outlet ducts 306.1-306.4, while the respective second inlets 376.1, 376.3, 376.5, 376.7 are about 0% unobstructed and are in full fluid communication with the respective first fluid channels 344.1, 344.3, 344.5, 344.7 and the bleed supply inlet duct 14 (FIG. 13) to direct the surge flow from the gas turbine engine 8 into the APU 18 (FIG. 1). Stated another way, the actuator 26 rotates the gear 98 clockwise to move the plate 396 such that the sections 109.1-109.4 obscure or cover about 100% of each of the respective second inlets 376.2, 376.4, 376.6, 376.8, as shown in FIG. 17A, which inhibits or prevents a flow of fluid into the load outlet ducts 306.1-306.4, while the second inlets 376.1, 376.3, 376.5, 376.7 remain fully open to enable the surge flow from the gas turbine engine 8 to flow into the APU 18 (FIG. 1). Thus, in the first, open surge position, the plate 396 provides full fluid flow from the gas turbine engine 8 to the APU 18 (FIG. 1).

Figure 17:
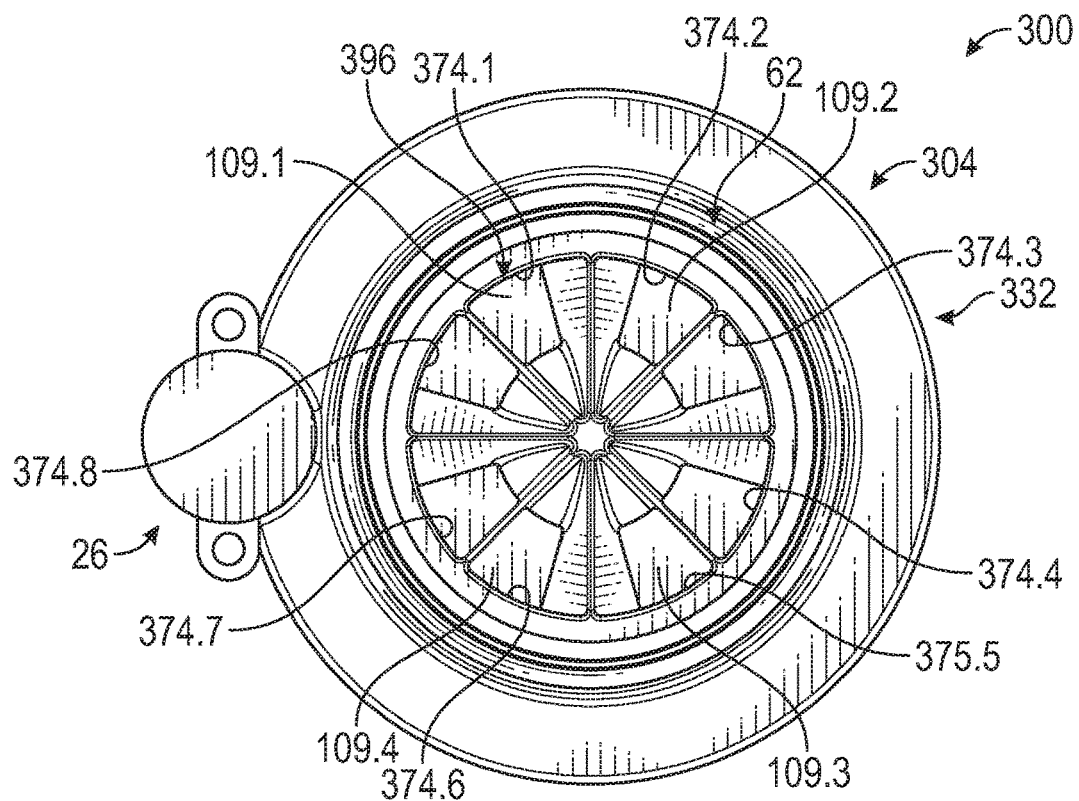
FIG. 17 is an end view of the second valve body of the rotary plate valve of FIG. 12, in which the rotary plate valve is in a second, closed position (0% open position)
Figure 17A:
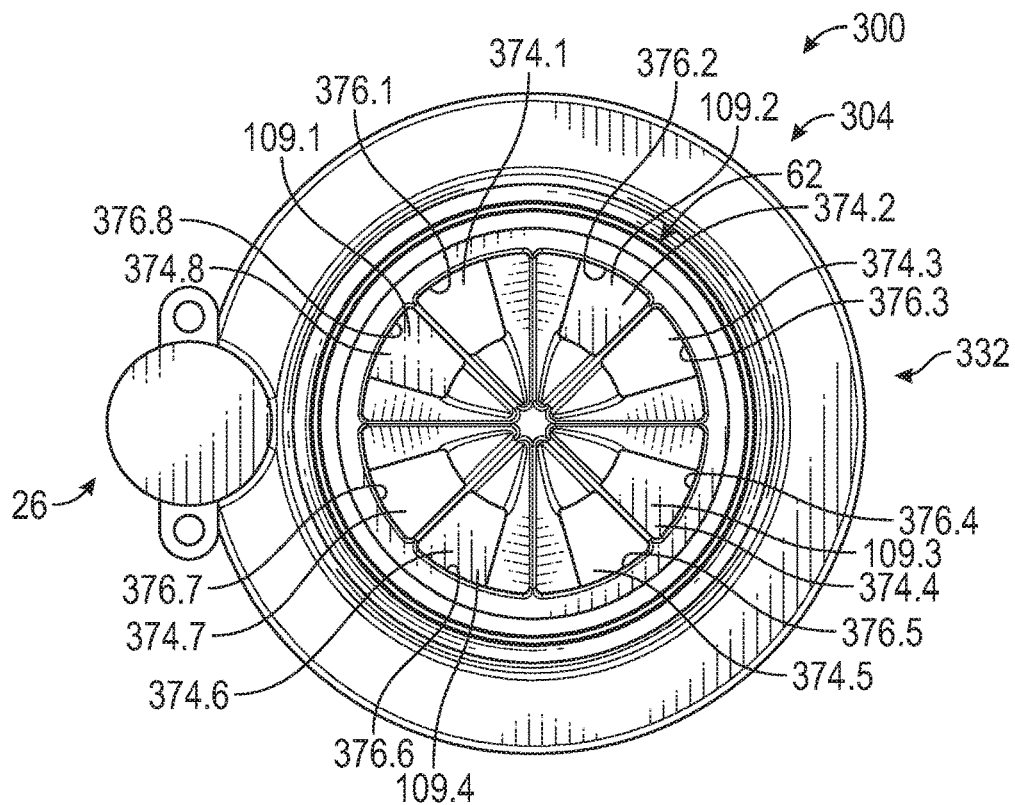
FIG. 17A is an end view of the second valve body of the rotary plate valve of FIG. 12, in which the rotary plate valve is a surge valve and is in a first, full surge open position (100% open for surge fluid flow)
Figure 17B:
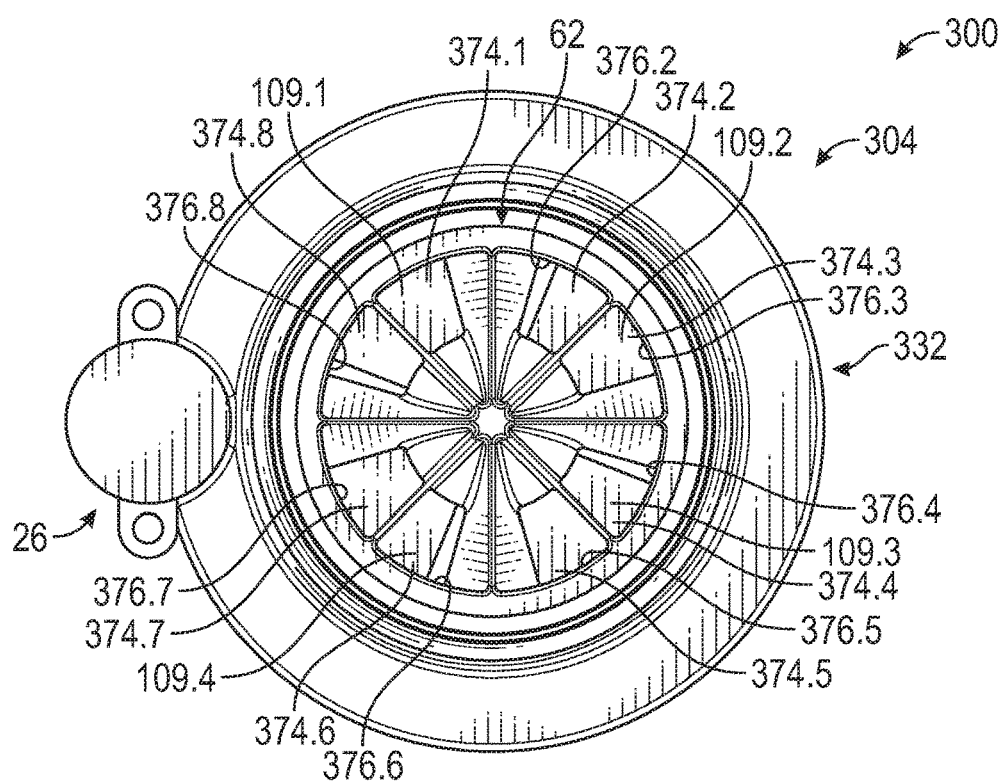
FIG. 17B is an end view of the second valve body of the rotary plate valve of FIG. 12, in which the rotary plate valve is a load valve and is in about a 25% open position (25% open for load fluid flow)

When the rotary plate valve 304 is a load valve, the rotary plate valve 304 is initially in the second, closed position as shown in FIG. 17. Based on the receipt of one or more control signals from the controller 28 to operate the rotary plate valve 304 as a load valve to provide about a 25% modulated flow, for example, the motor 120 drives the output shaft 122 to rotate the gear 98 (FIG. 13) in a clockwise direction to move the plate 396 and thus, the rotary plate valve 304 toward the about 25% open position. In one example, upon receipt of one or more control signals to move the rotary plate valve 304 to provide about a 25% modulated flow, with reference to FIG. 17B, the actuator 26 rotates the gear 98 (FIG. 13) clockwise for a predetermined rotational angle that corresponds to a movement of the plate 396 that results in about a 100% blockage or obstruction of flow through the second inlets 376.1, 376.3, 376.5, 376.7 that are associated with the surge ducts 308.1-308.4, while the second inlets 376.2, 376.4, 376.6, 376.8 are about 75% blocked or obstructed by the sections 109.1-109.4. Stated another way, the actuator 26 rotates the gear 98 clockwise to move the plate 396 such that the sections 109.1-109.4 obscure or cover about 100% of each of the second inlets 376.1, 376.3, 376.5, 376.7 and obscure or cover about 75% of each of the second inlets 376.2, 376.4, 376.6, 376.8, as shown in FIG. 17B, which inhibits or prevents a flow of fluid into the surge ducts 308.1-308.4, while the second inlets 376.2, 376.4, 376.6, 376.8 remain about 25% open to enable the modulated load flow from the APU 18 to flow through the load outlet ducts 306.1-306.4 to a downstream consumer, such as the gas turbine engine 8 (FIG. 1).

Figure 17C:
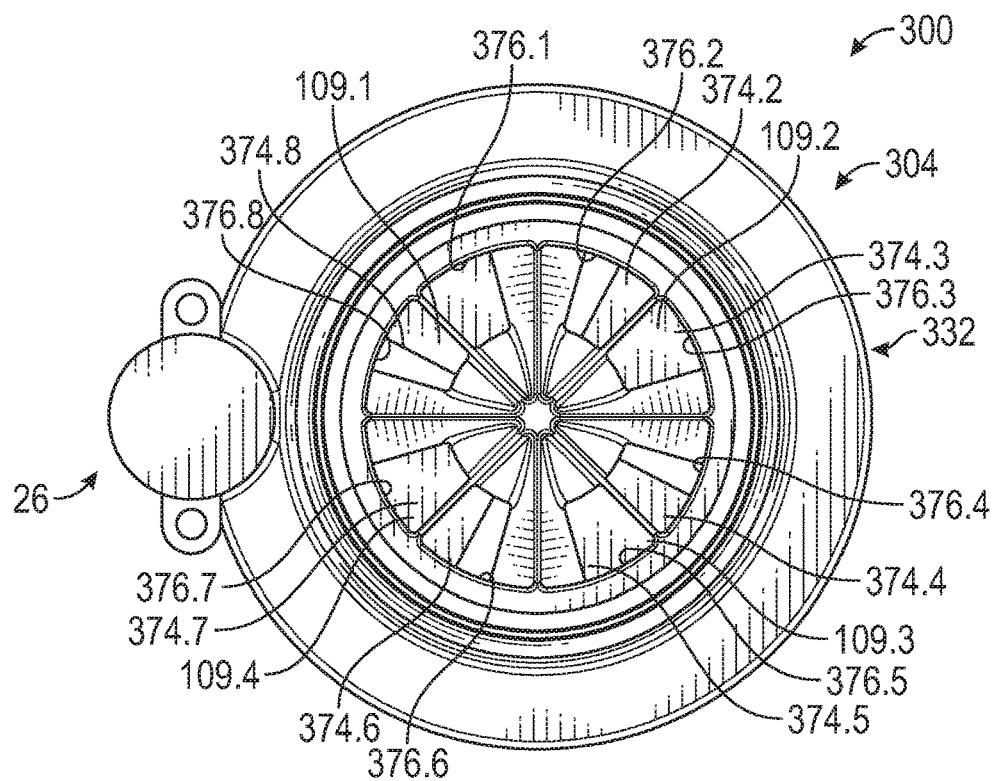
FIG. 17C is an end view of the second valve body of the rotary plate valve of FIG. 12, in which the rotary plate valve is a load valve and is in about a 50% open position (50% open for load fluid flow)

When the rotary plate valve 304 is a load valve, in another example, based on the receipt of one or more control signals from the controller 28 to operate the rotary plate valve 304 as a load valve to provide about a 50% modulated flow, for example, the motor 120 drives the output shaft 122 to rotate the gear 98 (FIG. 13) in a clockwise direction to move the plate 396 and thus, the rotary plate valve 304 toward the about 50% open position. In one example, upon receipt of one or more control signals to move the rotary plate valve 304 to provide about a 50% modulated flow, with reference to FIG. 17C, the actuator 26 rotates the gear 98 (FIG. 13) clockwise for a predetermined rotational angle that corresponds to a movement of the plate 396 that results in about a 100% blockage or obstruction of flow through the second inlets 376.1, 376.3, 376.5, 376.7 that are associated with the surge ducts 308.1-308.4, while the second inlets 376.2, 376.4, 376.6, 376.8 are about 50% blocked or obstructed by the sections 109.1-109.4. Stated another way, the actuator 26 rotates the gear 98 clockwise to move the plate 396 such that the sections 109.1-109.4 obscure or cover about 100% of each of the second inlets 376.1, 376.3, 376.5, 376.7 and obscure or cover about 50% of each of the second inlets 376.2, 376.4, 376.6, 376.8, as shown in FIG. 17C, which inhibits or prevents a flow of fluid into the surge ducts 308.1-308.4, while the second inlets 376.2, 376.4, 376.6, 376.8 remain about 50% open to enable the modulated load flow from the APU 18 to flow through the load outlet ducts 306.1-306.4 to a downstream consumer, such as the gas turbine engine 8 (FIG. 1).

Figure 17D:
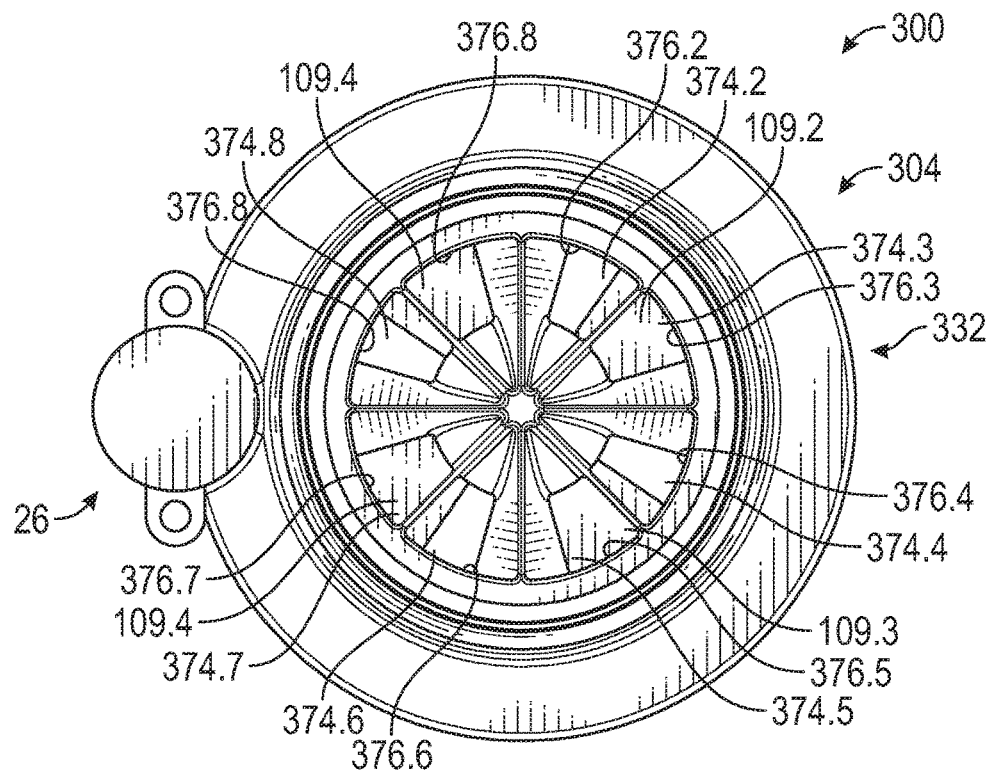
FIG. 17D is an end view of the second valve body of the rotary plate valve of FIG. 12, in which the rotary plate valve is a load valve and is in about a 75% open position (75% open for load fluid flow)

When the rotary plate valve 304 is a load valve, in another example, based on the receipt of one or more control signals from the controller 28 to operate the rotary plate valve 304 as a load valve to provide about a 75% modulated flow, for example, the motor 120 drives the output shaft 122 to rotate the gear 98 (FIG. 13) in a clockwise direction to move the plate 396 and thus, the rotary plate valve 304 toward the about 75% open position. In one example, upon receipt of one or more control signals to move the rotary plate valve 304 to provide about a 75% modulated flow, with reference to FIG. 17D, the actuator 26 rotates the gear 98 (FIG. 13) clockwise for a predetermined rotational angle that corresponds to a movement of the plate 396 that results in about a 100% blockage or obstruction of flow through the second inlets 376.1, 376.3, 376.5, 376.7 that are associated with the surge ducts 308.1-308.4, while the second inlets 376.2, 376.4, 376.6, 376.8 are about 25% blocked or obstructed by the sections 109.1-109.4. Stated another way, the actuator 26 rotates the gear 98 clockwise to move the plate 396 such that the sections 109.1-109.4 obscure or cover about 100% of each of the second inlets 376.1, 376.3, 376.5, 376.7 and obscure or cover about 25% of each of the second inlets 376.2, 376.4, 376.6, 376.8, as shown in FIG. 17D, which inhibits or prevents a flow of fluid into the surge ducts 308.1-308.4, while the second inlets 376.2, 376.4, 376.6, 376.8 remain about 75% open to enable the modulated load flow from the APU 18 to flow through the load outlet ducts 306.1-306.4 to a downstream consumer, such as the gas turbine engine 8 (FIG. 1).

Figure 17E:
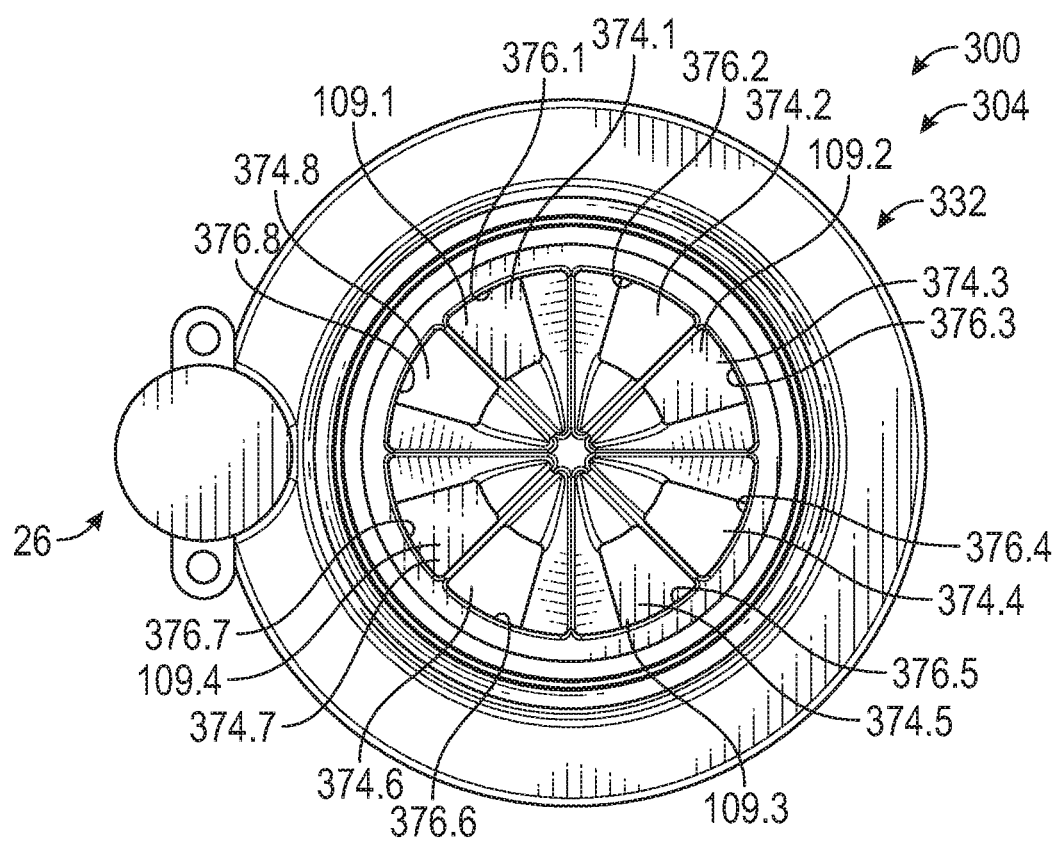
FIG. 17E is an end view of the second valve body of the rotary plate valve of FIG. 12, in which the rotary plate valve is a load valve and is in about a 100% open position (100% open for load fluid flow).

When the rotary plate valve 304 is a load valve, in another example, based on the receipt of one or more control signals from the controller 28 to operate the rotary plate valve 304 as a load valve to provide about a 100% or full load flow, for example, the motor 120 drives the output shaft 122 to rotate the gear 98 (FIG. 13) in a clockwise direction to move the plate 396 and thus, the rotary plate valve 304 toward the about 100% open position (third, open load position). In one example, upon receipt of one or more control signals to move the rotary plate valve 304 to provide about a 100% full load flow, with reference to FIG. 17E, the actuator 26 rotates the gear 98 (FIG. 13) clockwise for a predetermined rotational angle that corresponds to a movement of the plate 396 that results in about a 100% blockage or obstruction of flow through the second inlets 376.1, 376.3, 376.5, 376.7 that are associated with the surge ducts 308.1-308.4, while the second inlets 376.2, 376.4, 376.6, 376.8 are about 0% blocked or obstructed by the sections 109.1-109.4. Stated another way, the actuator 26 rotates the gear 98 clockwise to move the plate 396 such that the sections 109.1-109.4 obscure or cover about 100% of each of the second inlets 376.1, 376.3, 376.5, 376.7 and obscure or cover about 0% of each of the second inlets 376.2, 376.4, 376.6, 376.8, as shown in FIG. 17E, which inhibits or prevents a flow of fluid into the surge ducts 308.1-308.4, while the second inlets 376.2, 376.4, 376.6, 376.8 are fully open to enable full load fluid flow from the APU 18 to flow through the load outlet ducts 306.1-306.4 to a downstream consumer, such as the gas turbine engine 8 (FIG. 1).

In addition, based on the receipt of one or more control signals from the controller 28, the motor 120 drives the output shaft 122 to rotate the gear 98 (FIG. 13) in a counterclockwise direction to move the plate 396 and thus, the rotary plate valve 304 toward the second, closed position. In the second, closed position, each of the second inlets 376.1-376.8 is completely obstructed by the sections 109.1-109.4 such that no fluid flows from the first outlets 350.1-350.8 to the second inlets 376.1-376.8, and the rotary plate valve 304 is 0% open (FIG. 17). In the second, closed position, the rotary plate valve 304 provides substantially zero fluid flow between the bleed supply inlet duct 14 and the at least one outlet duct 302. It should be noted that the clockwise movement of the gear 98 described herein is merely exemplary, as the gear 98 may also be configured to move in a counterclockwise direction to move the plate 396 to the selected position. Moreover, it should be understood that when the rotary plate valve 304 is a load valve, the plate 296 is actively movable by the actuator 26 via the controller 28 to any position between the second, closed position (FIG. 17) and the first, open position (FIG. 17E) based on a downstream consumer demand, which allows for infinitely variable flow to the downstream consumer due to the nature of the modulating capability of the rotary plate valve 304.

Thus, the rotary plate valve system 300 enables the control of fluid flow through the at least one outlet duct 202 and the bleed supply inlet duct 14 with the plate 396, which is rotatable by the actuator 26 to vary a supply of fluid into and out of the at least one outlet duct 202. When used as a load valve, the rotation of the plate 396 to adjust the rotary plate valve 304 between the first, open position, the second, closed position and positions in-between enables the use of a smaller actuator 26, thereby reducing a weight and a cost of the rotary plate valve system 300. Further, by providing the first fluid channels 344.1-344.8, the openings 408.1-408.8 and the second fluid channels 374.1-374.8 with the same flowpath area, flow and pressure loses through the rotary plate valve 304 are reduced when compared to a butterfly valve. Moreover, the rotary plate valve 304 incorporates two different valve functions (load and surge) into a single valve, which reduces part cost, weight and cost. In addition, the use of fillets and radiuses reduces flow separation as the fluid flows through the rotary plate valve 304. The use of the individual fluid channels (the first fluid channels 344.1-344.8 and the second fluid channels 374.1-374.8) provides for smooth transitions of fluid flow through the rotary plate valve 304 and minimizes areas of flow separation and re-circulation, thus, keeping the flow uniform and reducing the pressure losses. The rotary plate valve 304 leads to a simpler design, lower weight, smaller volume, higher reliability and allows for infinitely variable modulated fluid flow to the downstream consumer. In addition, it should be noted that while the rotary plate valve system 300 is shown and described herein as including four load outlet ducts 306 and four surge ducts 308, the rotary plate valve system 300 may be employed with any number of load outlet ducts 306 and surge ducts 308.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A rotary valve system, comprising:
a first valve body having a first plurality of fluid channels, each one of the first plurality of fluid channels having a common first inlet to receive a fluid and a first outlet, the first plurality of fluid channels extend from the common first inlet along a common wall and diverge downstream from the common first inlet to define a first cavity within the first valve body;
a second valve body coupled to the first valve body, the second valve body having a second plurality of fluid channels, each one of the second plurality of fluid channels having a second inlet and a common second outlet, the second plurality of fluid channels converge within the second valve body downstream of the second inlet to the common second outlet and define a second cavity within the second valve body that is surrounded by the second plurality of fluid channels; and
a plate assembly having a plate coupled between the first valve body and the second valve body, the plate defining a plurality of openings, the plate movable between at least a first, open position in which each first outlet of the first plurality of fluid channels is in fluid communication with a respective second inlet of the second plurality of fluid channels and a second, closed position in which the second inlet of each of the second plurality of fluid channels is substantially completely obstructed by the plate, and a portion of the plate assembly is received within the first cavity.

2. The rotary valve system of claim 1, wherein the first cavity is surrounded by the first plurality of fluid channels, and the first cavity extends along a longitudinal axis of the rotary valve system.

3. The rotary valve system of claim 1, wherein the second cavity extends along a longitudinal axis of the rotary valve system.

4. The rotary valve system of claim 1, wherein the second valve body includes a shaft defined internally within the second valve body, the plate is coupled to the shaft for movement relative to the second plate body and the first plate body, and the shaft extends through the second cavity.

5. The rotary valve system of claim 1, wherein the second outlet is in fluid communication with a single outlet duct.

6. The rotary valve system of claim 1, further comprising an actuator coupled to the plate assembly that is responsive to one or more control signals to move the plate between the first, closed position, the second, open position and positions in-between the first, closed position and the second, open position.

7. The rotary valve system of claim 6, wherein the plate assembly further comprises a gear having a plurality of gear teeth coupled to the actuator and rotatable by the actuator, and the plate includes a plurality of plate gear teeth that meshingly engage with the plurality of gear teeth such that the rotation of the gear moves the plate between at least the first, open position and the second, closed position.

8. The rotary valve system of claim 1, wherein the first plurality of fluid channels comprise four first fluid channels defined within the first valve body that are spaced apart about a perimeter of the first valve body and the second plurality of fluid channels comprise four second fluid channels defined within the second valve body that are spaced apart about a perimeter of the second valve body, with each one of the first fluid channels in selective fluid communication with a respective one of the second fluid channels.

9. A rotary valve system, comprising:
a first valve body having a first plurality of fluid channels, each one of the first plurality of fluid channels having a common first inlet to receive a fluid and a first outlet, the first plurality of fluid channels extend from the common first inlet along a common wall and diverge downstream from the common first inlet to define a first cavity, the first cavity surrounded by the first plurality of fluid channels;
a second valve body coupled to the first valve body, the second valve body having a second plurality of fluid channels, each one of the second plurality of fluid channels having a second inlet and a common second outlet, the second plurality of fluid channels converge within the second valve body downstream of the second inlet to the common second outlet, and the second plurality of fluid channels cooperate to define a second cavity; and
a plate assembly having a plate coupled between the first valve body and the second valve body, the plate defining a plurality of openings, the plate movable between at least a first, open position in which each first outlet of the first plurality of fluid channels is in fluid communication with a respective second inlet of the second plurality of fluid channels and a second, closed position in which the second inlet of each of the second plurality of fluid channels is substantially completely obstructed by the plate, and a portion of the plate assembly is received within the first cavity.

10. The rotary valve system of claim 9, wherein the first cavity and the second cavity each extends along a longitudinal axis of the rotary valve system.

11. The rotary valve system of claim 9, wherein the second cavity is surrounded by the second plurality of fluid channels.

12. The rotary valve system of claim 9, wherein the second valve body includes a shaft defined internally within the second valve body, and the plate is coupled to the shaft for movement relative to the second plate body and the first plate body.

13. The rotary valve system of claim 12, wherein the shaft extends through the second cavity.

14. The rotary valve system of claim 9, further comprising an actuator coupled to the plate assembly that is responsive to one or more control signals to move the plate between the first, closed position, the second, open position and positions in-between the first, closed position and the second, open position.

15. The rotary valve system of claim 14, wherein the plate assembly further comprises a gear having a plurality of gear teeth coupled to the actuator and rotatable by the actuator, and the plate includes a plurality of plate gear teeth that meshingly engage with the plurality of gear teeth such that the rotation of the gear moves the plate between at least the first, open position and the second, closed position.

16. The rotary valve system of claim 9, wherein the first plurality of fluid channels comprise four first fluid channels defined within the first valve body that are spaced apart about a perimeter of the first valve body and the second plurality of fluid channels comprise four second fluid channels defined within the second valve body that are spaced apart about a perimeter of the second valve body, with each one of the first fluid channels in selective fluid communication with a respective one of the second fluid channels.

17. The rotary valve system of claim 9, wherein the second outlet is in fluid communication with a single outlet duct.

* * * * *